(12) United States Patent
Saotome et al.

(10) Patent No.: US 11,764,720 B2
(45) Date of Patent: Sep. 19, 2023

(54) CONTROL DEVICE AND CONTROL METHOD FOR THREE-PHASE BRUSHLESS MOTOR

(71) Applicant: Hitachi Astemo, Ltd., Hitachinaka (JP)

(72) Inventors: Hiroto Saotome, Hitachinaka (JP); Masaki Hano, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 12 days.

(21) Appl. No.: 17/642,163

(22) PCT Filed: Oct. 7, 2020

(86) PCT No.: PCT/JP2020/038010
§ 371 (c)(1),
(2) Date: Mar. 10, 2022

(87) PCT Pub. No.: WO2021/070869
PCT Pub. Date: Apr. 15, 2021

(65) Prior Publication Data
US 2022/0321047 A1    Oct. 6, 2022

(30) Foreign Application Priority Data
Oct. 11, 2019  (JP) ................. 2019-187605

(51) Int. Cl.
*H02P 27/08*    (2006.01)
*H02K 11/33*    (2016.01)
*H02P 6/08*     (2016.01)

(52) U.S. Cl.
CPC ............. *H02P 27/08* (2013.01); *H02K 11/33* (2016.01); *H02P 6/085* (2013.01)

(58) Field of Classification Search
CPC ...... H02P 21/00; H02P 21/0003; H02P 21/10; H02P 21/14; H02P 21/22; H02P 23/00;
(Continued)

(56) References Cited

U.S. PATENT DOCUMENTS 9,467,078 B2 * 10/2016 Mukai ................. B62D 5/0487
2004/0189243 A1    9/2004 Tobari et al.
(Continued)

FOREIGN PATENT DOCUMENTS

| JP | 3-230767 A | 10/1991 |
|----|-----------|---------|
| JP | 2002-276446 A | 9/2002 |

(Continued)

OTHER PUBLICATIONS

International Preliminary Report on Patentability (PCT/IB/326, PCT/IB/338 & PCT/IB/373) issued in PCT Application No. PCT/JP2020/038010 dated Apr. 21, 2022, including English translation of document C2 (Japanese-language Written Opinion (PCT/ISA/237), filed on Mar. 10, 2022 (eight (8) pages).

(Continued)

*Primary Examiner* — Antony M Paul
(74) *Attorney, Agent, or Firm* — Crowell & Moring LLP

(57) ABSTRACT

A three-phase brushless motor control device uses one shunt resistor disposed on a bus of an inverter as a drive circuit driving a three-phase brushless motor and acquires a two-phase current of the three-phase brushless motor at a predetermined timing to vector-control the three-phase brushless motor. At this time, in accordance with a duration in which the two-phase current cannot be accurately acquired, the control device varies an acquisition timing of the two-phase current or varies a period during which the three-phase brushless motor is vector-controlled.

20 Claims, 19 Drawing Sheets

(58) Field of Classification Search
CPC ...... H02P 23/0004; H02P 23/07; H02P 23/14; H02P 23/28; H02P 25/00; H02P 25/03; H02P 25/062; H02P 25/064; H02P 25/089; H02P 25/107; H02P 27/00; H02P 27/04; H02P 27/06; H02P 27/08; H02P 27/12; H02P 29/00; H02P 29/032; H02P 6/00; H02P 6/005; H02P 6/08; H02P 6/12; H02P 6/14; H02P 6/15; H02P 6/28
See application file for complete search history.

(56) References Cited

U.S. PATENT DOCUMENTS

| | | |
|---|---|---|
| 2015/0061554 A1 | 3/2015 | Kuratani |
| 2016/0072421 A1 | 3/2016 | Sugawara |
| 2016/0248351 A1 | 8/2016 | Sugawara et al. |
| 2019/0334456 A1 | 10/2019 | Kashima |

FOREIGN PATENT DOCUMENTS

| | | |
|---|---|---|
| JP | 2005-39912 A | 2/2005 |
| JP | 2006-254671 A | 9/2006 |
| JP | 2012-80740 A | 4/2012 |
| JP | 2013-59233 A | 3/2013 |
| JP | 2015-50908 A | 3/2015 |
| WO | WO 2014/171027 A1 | 10/2014 |
| WO | WO 2018/042636 A1 | 3/2018 |

OTHER PUBLICATIONS

International Search Report (PCT/ISA/210) issued in PCT Application No. PCT/JP2020/038010 dated Dec. 15, 2020 with English translation (six (6) pages).

Japanese-language Written Opinion (PCT/ISA/237) issued in PCT Application No. PCT/JP2020/038010 dated Dec. 15, 2020 (five (5) pages).

* cited by examiner

CONTROL DEVICE AND CONTROL METHOD FOR THREE-PHASE BRUSHLESS MOTOR

TECHNICAL FIELD

The present invention relates to a control device and to a control method for a three-phase brushless motor.

BACKGROUND ART

As disclosed in JP 2005-39912 A (Patent Document 1), as a technique for controlling a three-phase brushless motor, there is known a technique that employs a one-shunt current detection method for vector control on a three-phase brushless motor to achieve convergence to a target value. The one-shunt current detection method is a current detection method in which a two-phase current is detected by a shunt resistor disposed on a bus (DC line) of an inverter driving the three-phase brushless motor and in which another one-phase current is detected by utilizing the characteristic: the sum total of a three-phase current is equal to 0.

REFERENCE DOCUMENT LIST

Patent Document

Patent Document 1: JP 2005-39912 A

SUMMARY OF THE INVENTION

Problem to be Solved by the Invention

In the one-shunt current detection method, when a PWM (Pulse Width Modulation) pulse signal driving each phase coil of the three-phase brushless motor is turned on/off in a short period of time, it becomes impossible to accurately acquire the two-phase current due to ringing or the like. In a case in which the period during which there appears a duration in which the two-phase current cannot be accurately acquired and the acquisition period for the two-phase current are different from each other, the problem does not easily arise, whereas when, for example, the rotation speed of the three-phase brushless motor varies, there is a risk the acquisition period of the two-phase current and the duration in which the two-phase current cannot be accurately acquired coinciding with each other. When, in such a state, vector control is performed on the three-phase brushless motor, the two-phase current cannot be acquired accurately, so that difference results between the current detected by the shunt resistor and the actual current, and there is a risk of the actual current greatly fluctuating due to improper vector control. When the actual current of the three-phase brushless motor greatly fluctuates, it becomes, for example, rather difficult to converge the rotation speed and rotation angle of the three-phase brushless motor to target values.

It is accordingly an object of the present invention to provide a control device and a control method for a three-phase brushless motor in which the fluctuation of the actual current when vector control is performed on the three-phase brushless motor by using the one-shunt current detection method is suppressed.

Means for Solving the Problem

According to an aspect of the present embodiment, a three-phase brushless motor control device uses one shunt resistor disposed on a bus of a drive circuit driving the three-phase brushless motor and acquires a two-phase current of the three-phase brushless motor at a predetermined timing to vector-control the three-phase brushless motor. At this time, the three-phase brushless motor control device varies an acquisition timing of the two-phase current in accordance with a duration in which the two-phase current cannot be accurately acquired.

According to another aspect of the present embodiment, a three-phase brushless motor control device uses one shunt resistor disposed on a bus of a drive circuit driving the three-phase brushless motor and acquires a two-phase current of the three-phase brushless motor at a predetermined timing to vector-control the three-phase brushless motor. At this time, the three-phase brushless motor control device varies a period during which the three-phase brushless motor is vector-controlled in accordance with a duration in which the two-phase current cannot be accurately acquired.

Effects of the Invention

In accordance with the present invention, it is possible to suppress fluctuation in the actual current of a three-phase brushless motor when vector control is performed on the three-phase brushless motor by using the one-shunt current detection method.

MODE FOR CARRYING OUT THE INVENTION

In the following, an embodiment for carrying out the present invention will be described in detail with reference to the appended drawings.

Figure 1:
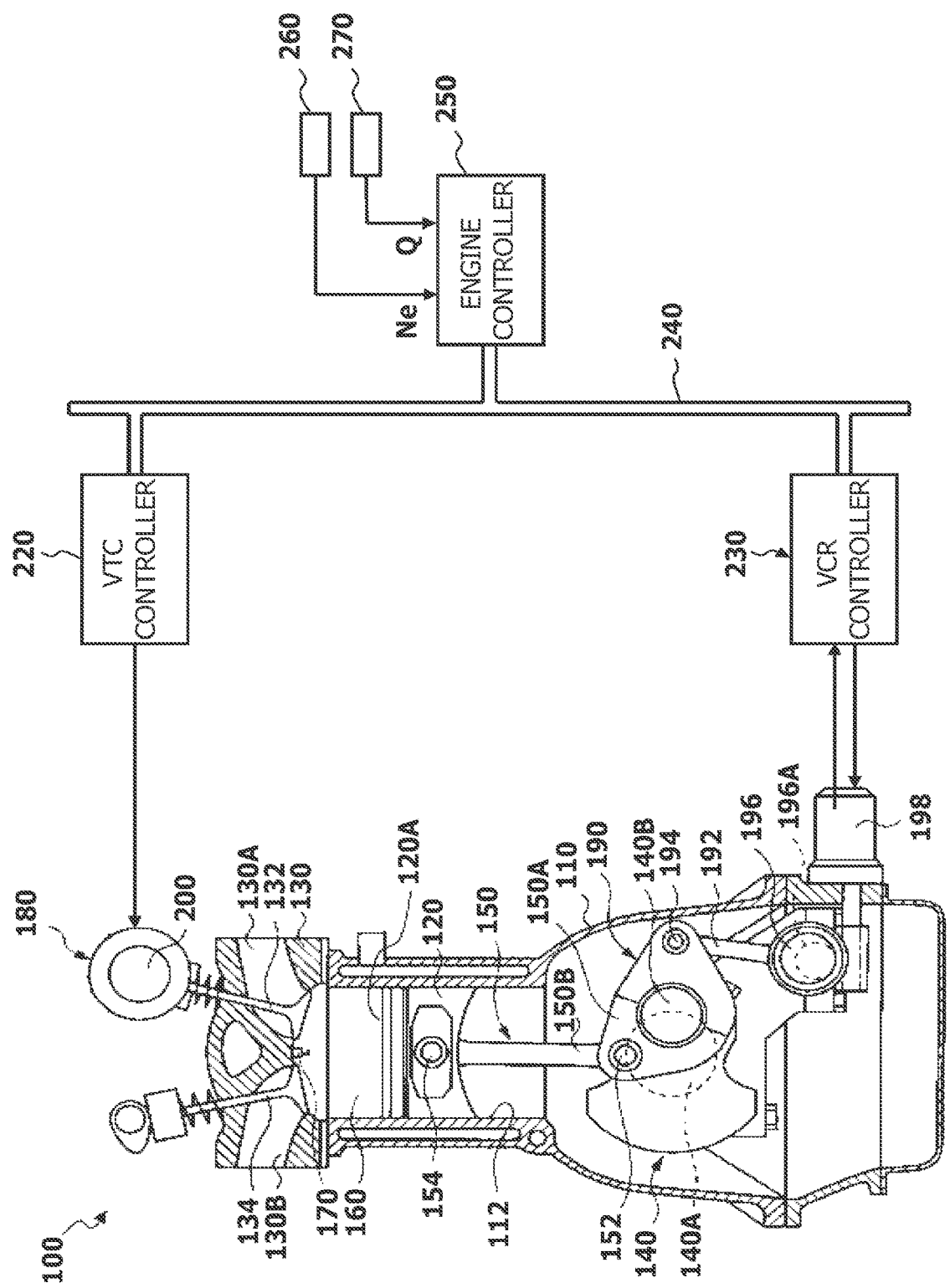
FIG. 1 is a system diagram illustrating an example of an internal combustion engine mounted in a vehicle.

FIG. 1 illustrates an example of an internal combustion engine 100 mounted in a vehicle such as an automobile.

Internal combustion engine 100 has a cylinder block 110, a piston 120 reciprocatably fitted into a cylinder bore 112 of cylinder block 110, a cylinder head 130 in which an intake port 130A and an exhaust port 130B are formed, an intake valve 132 opening and closing an opening end of intake port 130A, and an exhaust valve 134 opening and closing an opening end of exhaust port 130B.

Piston 120 is connected to a crankshaft 140 via a connecting rod 150 including a lower link 150A and an upper link 150B. In addition, a combustion chamber 160 is formed between a crest surface 120A of piston 120 and a lower surface of cylinder head 130. Substantially at the center of cylinder head 130 forming combustion chamber 160, there is mounted an ignition plug 170 igniting a mixture of fuel and air.

Internal combustion engine 100 is further equipped with a variable valve timing (VTC: Valve Timing Control) mechanism 180 making the phase of the opening period of intake valve 132 with respect to crankshaft 140 variable, and a variable compression ratio (VCR: Variable Compression Ratio) mechanism 190 making the compression ratio variable by varying the volume of combustion chamber 160.

VTC mechanism 180 varies the phase of an intake cam shaft 200 with respect to crankshaft 140 by an actuator such as an electric motor or a hydraulic motor, thereby advancing or delaying the central phase of an operation angle while keeping the operation angle of intake valve 132 fixed.

VCR mechanism 190 varies the volume of combustion chamber 160 by a double link mechanism as disclosed in JP 2002-276446 A, thereby making the compression ratio of internal combustion engine 100 variable. In the following, an example of VCR mechanism 190 will be described.

Crankshaft 140 has a plurality of journal portions 140A and a plurality of crank pin portions 140B, and journal portions 140A are rotatably supported by a main bearing (not illustrated) of cylinder block 110. Crank pin portions 140B are eccentric to journal portions 140A, and lower link 150A is rotatably connected thereto. The lower end side of upper link 150B is rotatably connected to one end of lower link 150A by a connection pin 152, and the upper end side thereof is rotatably connected to piston 120 by a piston pin 154. The upper end side of a control link 192 is rotatably connected to the other end of lower link 150A by a connection pin 194, and the lower end side thereof is rotatably connected to a lower portion of cylinder block 110 via a control shaft 196. More specifically, control shaft 196 is rotatably supported by the engine main body (cylinder block 110), and has an eccentric cam portion 196A eccentric to the rotation center thereof, and the lower end portion of control link 192 is rotatably fit-engaged with this eccentric cam portion 196A. The rotational position of control shaft 196 is controlled by a three-phase brushless motor 198 which is an example of a compression ratio control actuator.

In VCR mechanism 190 employing such a double link mechanism, when control shaft 196 is rotated by three-phase brushless motor 198, the central position of eccentric cam portion 196A, that is, the relative position with respect to the engine main body (cylinder block 110) varies. As a result, when a swing support position at the lower end of control link 192 varies, the position of piston 120 at the piston top dead center (TDC) is heightened or lowered, and the volume of combustion chamber 160 increases or decreases, with the compression ratio of internal combustion engine 100 being varied. At this time, when the operation of three-phase brushless motor 198 is stopped, due to the reciprocation of piston 120, control link 192 rotates with respect to eccentric cam portion 196A of control shaft 196, and the compression ratio shifts to the low compression side.

VTC mechanism 180 and VCR mechanism 190 are respectively electronically controlled by a VTC controller 220 and a VCR controller 230 containing a microcomputer. VTC controller 220 and VCR controller 230 are connected to an engine controller 250 containing a microcomputer electronically controlling internal combustion engine 100 via, for example, a CAN (Controller Area Network) 240 which is an example of a vehicle-mounted network. Accordingly, among VTC controller 220, VCR controller 230, and engine controller 250, it is possible to transmit and receive arbitrary data via CAN 240. The vehicle-mounted network is not restricted to CAN 240 but it is possible to employ a well-known network such as FlexRay (registered trademark). Here, VCR controller 230 is to be regarded as an example of the control device for three-phase brushless motor 198.

Input to engine controller 250 are output signals from a rotation speed sensor 260 detecting the rotation speed Ne of internal combustion engine 100 and from a load sensor 270 detecting the load Q of internal combustion engine 100 as an example of the operating state of internal combustion engine 100. Here, as the load Q of internal combustion engine 100, it is possible to use, for example, a condition amount closely related to the demand torque such as the intake negative pressure, intake flow rate, supercharging pressure, accelerator opening, or throttle opening. Engine controller 250 refers, for example, to a map in which target values suited to the rotation speed and the load are set, and respectively calculates a target angle of VTC mechanism 180 and a target compression ratio of VCR mechanism 190 that are in accordance with the rotation speed Ne and the load Q of internal combustion engine 100. In addition, engine controller 250 transmits the target angle to VTC controller 220, and transmits the target compression ratio to VCR controller 230, via CAN 240.

VTC controller 220 having received the target angle controls a drive current output to an actuator of VTC mechanism 180 such that the actual angle detected by a sensor (not illustrated) converges to the target angle. As described in detail below, VCR controller 230 having received the target compression ratio vector-controls three-phase brushless motor 198 of VCR mechanism 190 such that the actual compression ratio detected by a sensor (not illustrated) converges to the target compression ratio. By doing so, VTC mechanism 180 and VCR mechanism 190 are controlled to target values in accordance with the operating state of internal combustion engine 100.

Figure 2:
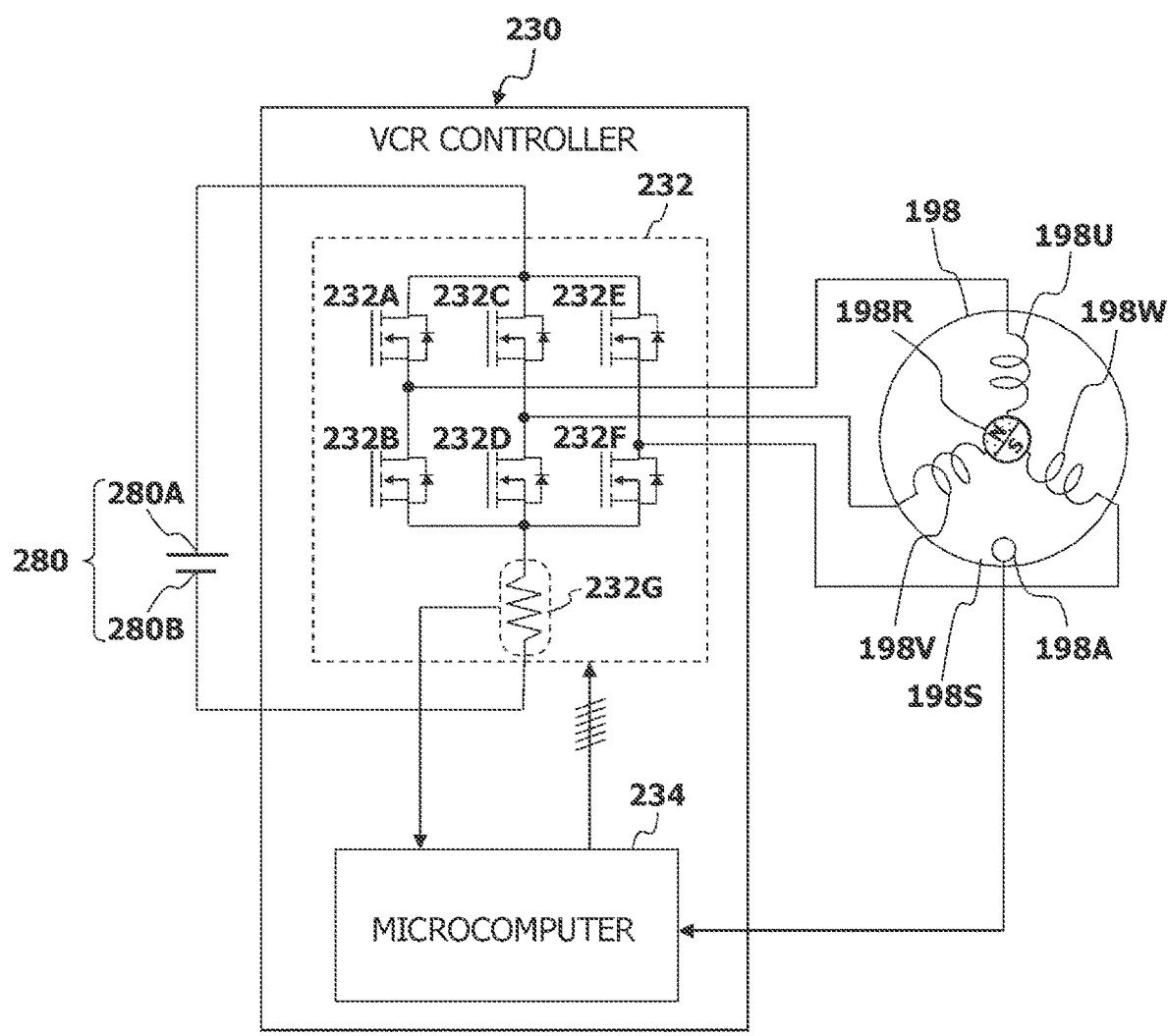
FIG. 2 is an explanatory view of a variable compression ratio controller and a three-phase brushless motor.

FIG. 2 illustrates an example of the inner structures of three-phase brushless motor 198 and of a VCR controller 230 vector-controlling the same.

Three-phase brushless motor 198 is equipped with a substantially cylindrical stator 198S around which a U-phase coil 198U, a V-phase coil 198V, and a W-phase coil 198W are wound while star-connected, and a rotor 198R rotatably arranged on the inner peripheral surface of stator 198S. The rotation drive shaft of rotor 198R protrudes to the exterior from an end portion in the axial direction of stator 198S, and a control shaft 196 of VCR mechanism 190 is connected to the protruding portion via a speed reduction device. Mounted to a predetermined portion of three-phase brushless motor 198 is a rotation angle sensor 198A outputting an angle signal that is in accordance with the rotation angle of a rotor 198R having a reference position as the cardinal point. As rotation angle sensor 198A, it is possible to employ, for example, an encoder or a resolver.

VCR controller 230 is equipped with an inverter 232 as a drive circuit driving three-phase brushless motor 198, and a microcomputer 234.

Inverter 232 is a power-source circuit transforming a DC current supplied from a battery 280 mounted in the vehicle to an AC current and selectively applying this to U-phase coil 198U, V-phase coil 198V, and W-phase coil 198W of three-phase brushless motor 198 for driving. Inverter 232 is a three-phase bridge circuit formed by appropriately connecting switching elements 232A through 232F such as an N-channel type MOSFET (Metal Oxide Semiconductor Field Effect Transistor) having a reflux diode.

More specifically, inverter 232 has a U-phase arm to which switching elements 232A and 232B are connected in series, a V-phase arm to which switching elements 232C and 232D are connected in series, and a W-phase arm to which switching elements 232E and 232F are connected in series. Switching elements 232A through 232F are not restricted to N-channel type MOSFETs. They may also be P-channel type MOSFETs, NPN type transistors, PNP type transistors, IGBT (Insulated Gate Bipolar Transistor) or the like.

In the U-phase arm, the drain of upper-stage switching element 232A is connected to a positive terminal 280A of battery 280; the source of upper-stage switching element 232A is connected to the drain of lower-stage switching element 232B; and source of lower-stage switching element 232B is connected to a negative terminal 280B of battery 280. In addition, an electric path situated between upper-stage switching element 232A and lower-stage switching element 232B is connected to U-phase coil 198U of three-phase brushless motor 198 via a U-phase drive line.

In the V-phase arm, the drain of upper-stage switching element 232C is connected to positive terminal 280A of battery 280; the source of upper-stage switching element 232C is connected to the drain of lower-stage switching element 232D; and the source of lower-stage switching element 232D is connected to negative terminal 280B of battery 280. In addition, an electric path situated between upper-stage switching element 232C and lower-stage switching element 232D is connected to V-phase coil 198V of three-phase brushless motor 198 via a V-phase drive line.

In the W-phase arm, the drain of upper-stage switching element 232E is connected to positive terminal 280A of battery 280; the source of upper-stage switching element 232E is connected to the drain of lower-stage switching element 232F; and the source of lower-stage switching element 232F is connected to negative terminal 280 B of battery 280. In addition, an electric path situated between upper-stage switching element 232E and lower-stage switching element 232F is connected to W-phase coil 198W of three-phase brushless motor 198 via W-phase drive line.

Disposed in the common electric path connecting the sources of lower-stage switching elements 232B, 232D, and 232F and negative terminal 280B of battery 280, that is, on the bus of inverter 232, is one shunt resistor 232G for realizing a one-shunt current detection method. This shunt resistor 232G detects a two-phase current flowing through a selectively driven two-phase coil of U-phase coil 198U, V-phase coil 198V, and W-phase coil 198W of three-phase brushless motor 198.

Figure 3:
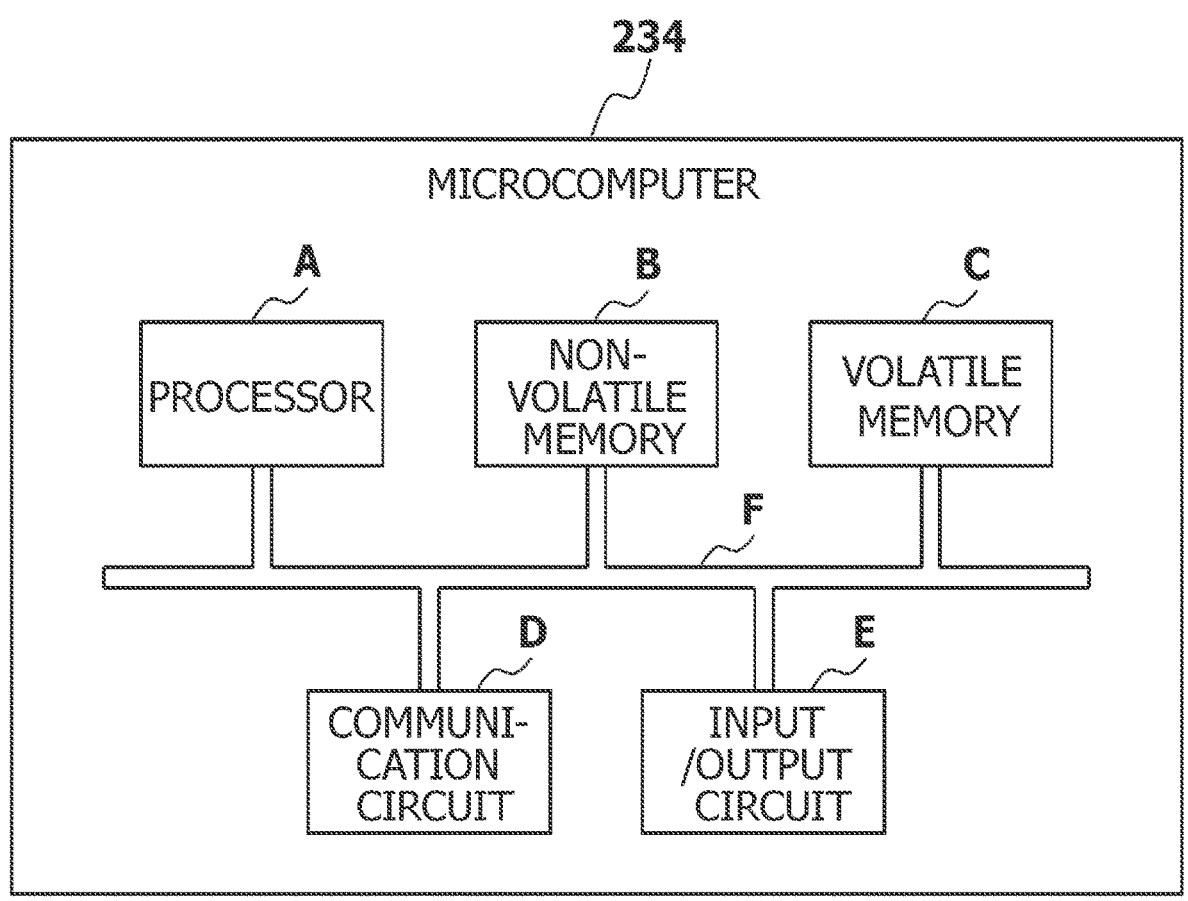
FIG. 3 is an explanatory view of the internal structure of a microcomputer.

As illustrated in FIG. 3, microcomputer 234 contains a processor A, non-volatile memory B, volatile memory C, a communication circuit D, an input/output circuit E, and an inner bus F connecting these so as to allow mutual communication.

Processor A is hardware executing an order set described in an application program, and consists, for example, of a CPU (Central Processing Unit). Non-volatile memory B is a semiconductor memory element capable of maintaining data even if the power supply is cut off, and consists, for example, of EEPROM (Electrically Erasable Programmable Read Only Memory) or flush ROM (Read Only Memory). Volatile memory C is a semiconductor memory element in which data is lost when the power supply is cut off, and consists, for example, of DRAM (Dynamic Random Access Memory) or SRAM (Static Random Access Memory). The communication circuit D is a device for performing communication with another controller via the vehicle-mounted network including CAN, and consists, for example, of a CAN transceiver. The input/output circuit E is a device which reads an analog signal or a digital signal from various sensors or switches and which outputs an analog or digital drive signal to an actuator or the like, and consists, for example, of an A/D converter or a D/D converter.

In addition, respectively input to microcomputer 234 via input/output circuit E thereof are the angle signal of rotation angle sensor 198A of three-phase brushless motor 198 and the two-phase current signal of shunt resistor 232G of inverter 232.

Figure 4:
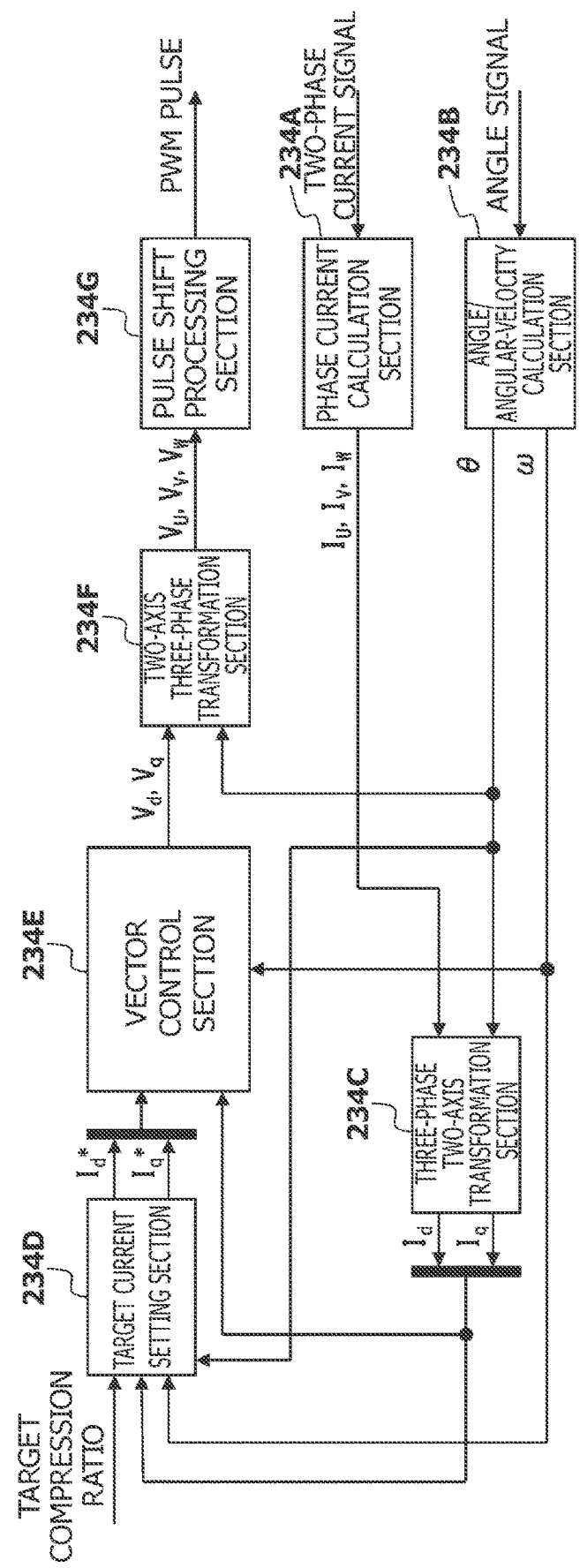
FIG. 4 is an explanatory view of a functional block performing vector control on a three-phase brushless motor.

Processor A of microcomputer 234 executes the application program stored in non-volatile memory B, whereby, as illustrated in FIG. 4, it respectively implements a phase current calculation section 234A, an angle/angular-velocity calculation section 234B, a three-phase two-axis transformation section 234C, a target current setting section 234D, a vector control section 234E, a two-axis three-phase transformation section 234F, and a pulse shift processing section 234G.

Phase current calculation section 234A reads the two-phase current signal from shunt resistor 232G of inverter 232, and by utilizing the characteristic: the sum total of three-phase currents is equal to zero, respectively calculates the U-phase current $I_U$, the V-phase current $I_V$, and the W-phase current $I_W$ of three-phase brushless motor 198. Angle/angular-velocity calculation section 234B reads an angle signal from rotation angle sensor 198A of three-phase brushless motor 198, and performs a predetermined computation on the angle signal, thereby calculating the rotation angle θ of rotor 198R of three-phase brushless motor 198. In addition to the rotation angle θ of rotor 198R, angle/angular-velocity calculation section 234B calculates the angular velocity ω of rotor 198R of three-phase brushless motor 198 from the chronological change in the rotation angle θ. Three-phase two-axis transformation section 234C respectively reads the U-phase current $I_U$, the V-phase current $I_V$, and the W-phase current $I_W$ from phase current calculation section 234A, and the rotation angle θ from angle/angular-velocity calculation section 234B, and effects coordinate transformation from fixed coordinate system to rotating coordinate system through spatial vector transformation, thereby respectively calculating a d-axis current $I_d$ and a q-axis current $I_q$ in the rotating coordinate system. Here, the d-axis current is a current component not contributing to torque in the rotating coordinate system, and the q-axis current is a current component contributing to torque in the rotating coordinate system.

Target current setting section 234D respectively reads the target compression ratio from an external engine controller 250, the rotation angle θ and the angular velocity ω from angle/angular-velocity calculation section 234B, and the d-axis current $I_d$ and the q-axis current $I_q$ from three-phase two-axis transformation section 234C, and respectively sets a d-axis current command $I_d^*$ and a q-axis current command $I_q^*$ for converging three-phase brushless motor 198 to a target compression ratio. That is, target current setting section 234D executes feedback control such as proportional-plus-integral control (PI control) such that the rotation angle θ approximates a target rotation angle that is in accordance with the target compression ratio, and respectively sets the d-axis current command $I_d^*$ and the q-axis current command $I_q^*$ for converting three-phase brushless motor 198 to the target compression ratio.

Vector control section 234E respectively reads the angular velocity ω from angle/angular-velocity calculation section 234B, the d-axis current $I_d$ and the q-axis current $I_q$ from three-phase two-axis transformation section 234C, and the d-axis current command $I_d^*$ and the q-axis current command $I_q^*$ from target current setting section 234D, and respectively calculates a d-axis voltage command $V_d$ and a q-axis voltage command $V_q$ for vector-controlling three-phase brushless motor 198. The specific method of calculating the d-axis voltage command $V_d$ and the q-axis voltage command $V_q$ is a well-known technique for those skilled in the art, so a detailed description thereof will be left out.

Two-axis three-phase transformation section 234F respectively reads the rotation angle θ from angle/angular-velocity calculation section 234B, and the d-axis voltage command $V_d$ and the q-axis voltage command $V_q$ from vector control section 234E, and effects coordinate transformation from rotating coordinate system to fixed coordinate system through spatial vector transformation, thereby respectively calculating a U-phase voltage command $V_U$, a V-phase voltage command $V_V$, and a W-phase voltage command $V_W$ in the fixed coordinate system. Pulse shift processing section 234G reads the U-phase voltage command $V_U$, the V-phase voltage command $V_V$, and the W-phase voltage command $V_W$ from two-axis three-phase transformation section 234F, and, by using a triangular wave carrier, generates the duty ratio of a PWM pulse for driving switching elements 232A through 232F of inverter 232, and outputs the same.

Accordingly, VCR controller 230 causes a current to flow successively from U-phase coil 198U to V-phase coil 198V, from U-phase coil 198U to W-phase coil 198W, from V-phase coil 198V to W-phase coil 198W, from V-phase coil 198V to U-phase coil 198U, from W-phase coil 198W to U-phase coil 198U, and from W-phase coil 198W to V-phase coil 198V in accordance with the target compression ratio, the rotation angle θ of rotor 198R and the two-phase current of three-phase brushless motor 198, whereby it is possible to convert VCR mechanism 190 to an arbitrary target compression ratio.

Figure 5:
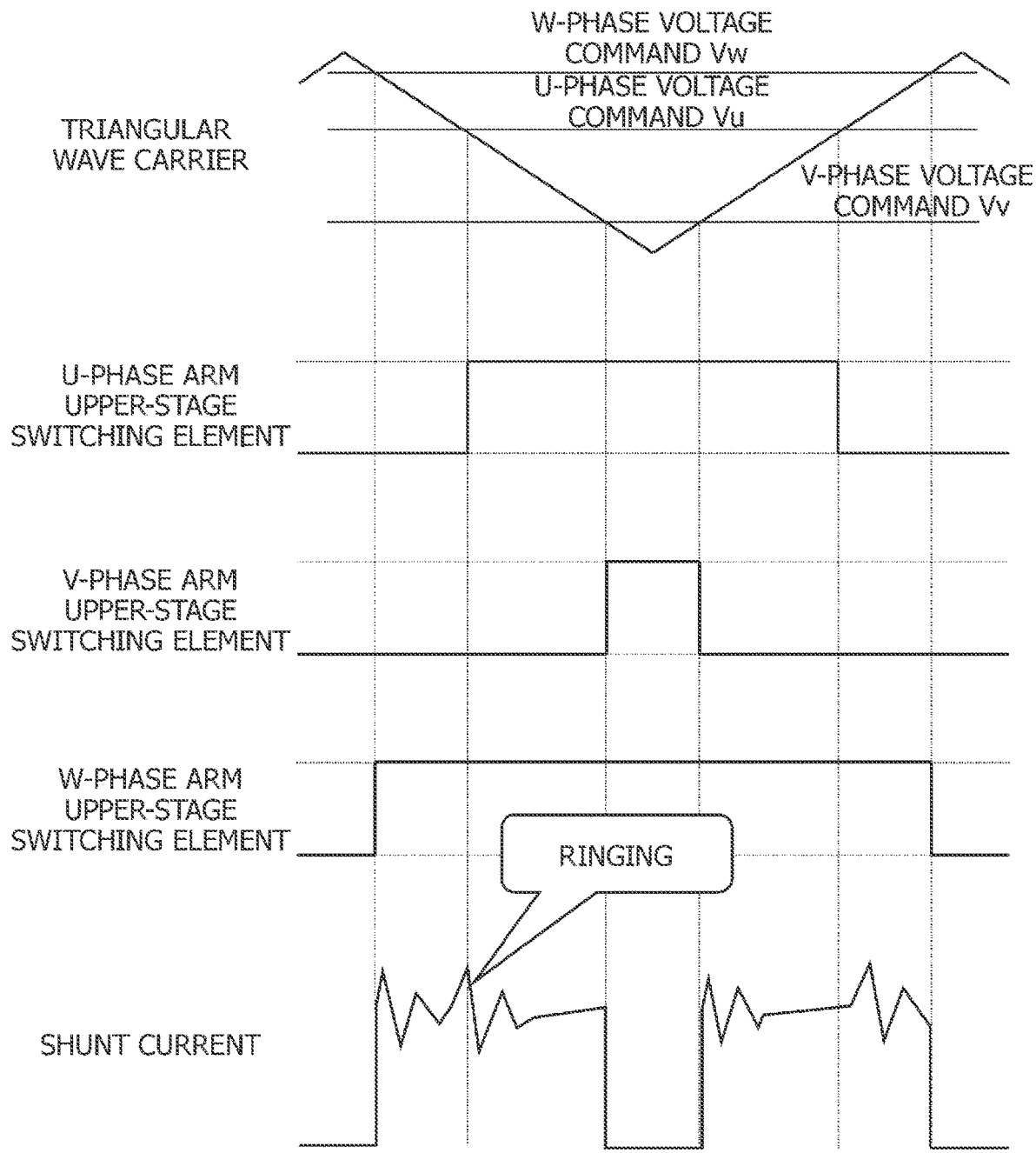
FIG. 5 is an explanatory view illustrating the cause of the generation of a state in which a two-phase current cannot be accurately acquired.

Here, a problem in the one-shunt current detection method will be discussed with reference to FIG. 5.

In the vector control of three-phase brushless motor 198, when the triangular wave carrier attains a level not lower than U-phase voltage command $V_U$, switching element 232A of the U-phase arm upper side is turned ON; when the triangular wave carrier attains a level not lower than V-phase voltage command $V_V$, switching element 232C of the V-phase upper side is turned ON; and when the triangular wave carrier attains a level not lower than W-phase voltage command $V_W$, switching element 232E of the W-phase arm upper side is turned ON. Immediately after switching elements 232A through 232F of inverter 232 are switched to ON or OFF, there is generated ringing, in which the shunt current detected by shunt resistor 232G fluctuates. Between the timings with which switching elements 232A, 232C, and 232E are turned ON/OFF, it is possible to detect the current flowing through U-phase coil 198U, V-phase coil 198V, or W-phase coil 198W.

In the illustrated example, however, for example, the period of time until switching element 232A of the U-phase arm upper side is turned ON since switching element 232E of the W-phase arm upper side is turned ON is short, so that the ringing is not completed in the period, and it is impossible to accurately acquire the two-phase current including the current flowing through W-phase coil 198W. Thus, there arises a state in which it is impossible to accurately acquire the two-phase current at a period in accordance with the duty ratio of the PWM pulse for driving U-phase coil 198U, V-phase coil 198V, and W-phase coil 198W of three-phase brushless motor 198. In short, there arises periodically a duration in which it is impossible to accurately acquire the two-phase current in accordance with the duty ratio of the PWM pulse. Here, the period during which there arises the duration in which it is impossible to accurately acquire the two-phase current is, for example, a period during which there arises a state in which the duty ratios of the PWM pulses driving the two-phase coils are equal or substantially equal, a period during which there arises a state in which one phase current of the three-phase AC current crosses another phase current, or a period for each electrical angle of 60°. In the following description, the duration in which the two-phase current cannot be accurately acquired will be referred to as the current acquisition disabled duration.

In the case in which the period during which the current acquisition disabled duration arises and the two-phase current acquisition period are different from each other, the problem does not easily arise. However, in the case in which three-phase brushless motor 198 of VCR mechanism 190 is vector-controlled, the current is varied such that the actual compression ratio converges to the target compression ratio, so that the rotation speed of three-phase brushless motor 198 varies, and there is a risk of the period during which the current acquisition disabled duration arises and the two-phase current acquisition period coinciding with each other. In this case, there is the possibility of the two-phase current acquisition period and the current acquisition disabled duration coinciding with each other, and the current acquired by shunt resistor 232G and the actual current differ from each other, making it difficult to appropriately vector-control three-phase brushless motor 198.

In view of this, in the present embodiment, when vector-controlling three-phase brushless motor 198 by employing the one-shunt current detection method, the two-phase current acquisition timing is varied, or the control period of three-phase brushless motor 198 is varied, in accordance with the current acquisition disabled duration. By doing so, the current acquisition disabled duration and the two-phase current acquisition period cease to coincide with each other, so that the difference between the current acquired by shunt resistor 232G and the actual current is diminished or nullified, and it is possible to suppress the fluctuation of the actual current of three-phase brushless motor 198. In addition, by suppressing the fluctuation of the actual current of three-phase brushless motor 198, the torque fluctuation of three-phase brushless motor 198 is diminished, whereby it is possible, for example, to prevent noise generation in VCR mechanism 190, and to achieve an improvement in terms of the compression ratio variation speed of internal combustion engine 100. In the following, the current acquisition method for acquiring the two-phase current by the one-shunt current detection method will be described with reference to specific embodiments.

1. First Embodiment

Figure 6:
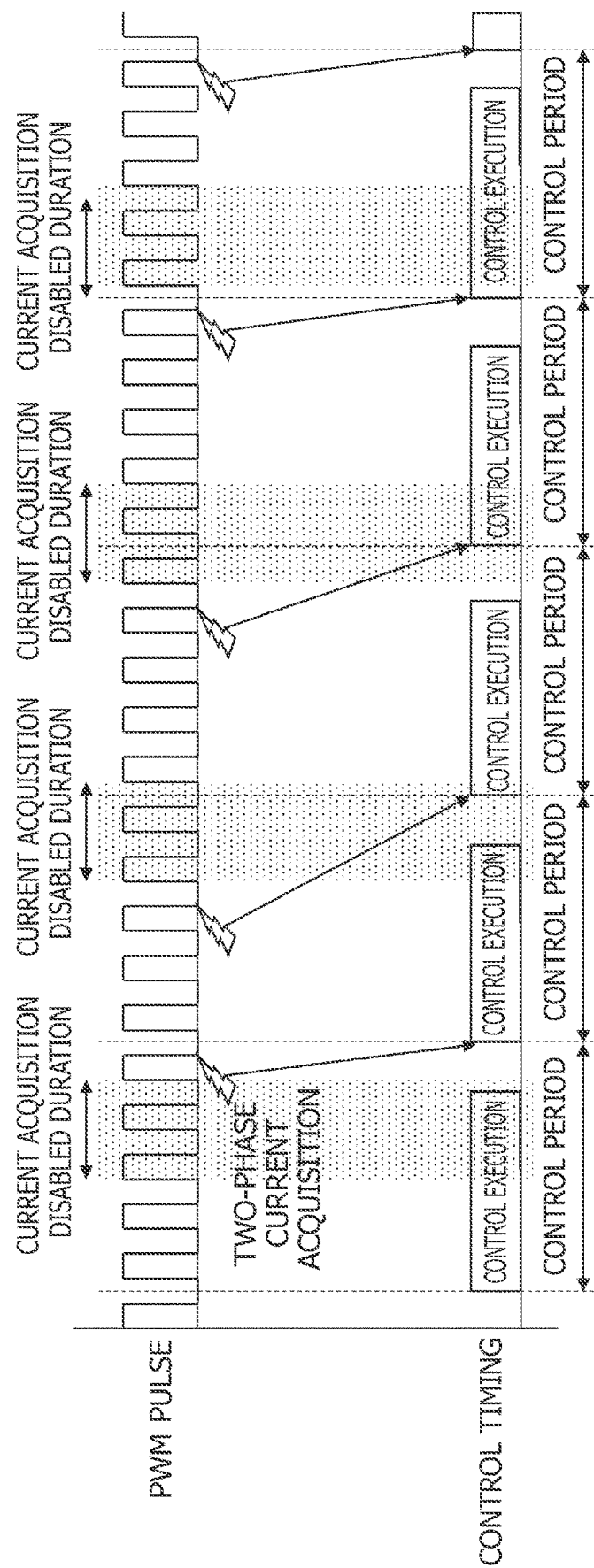
FIG. 6 is a schematic view of a two-phase current acquisition method according to a first embodiment.

FIG. 6 schematically illustrates a current acquisition method according to a first embodiment. In the first embodiment, the control period for vector-controlling three-phase brushless motor 198 is double the current acquisition disabled duration or more, and, under this condition, it is set, for example, to a fixed value in accordance with requisite control precision. The period of the PWM pulse is set to be not more than the period during which the current acquisition disabled duration appears.

At the initial stage of the control period, three-phase brushless motor 198 is vector-controlled, and feedback control for approximating the compression ratio of internal combustion engine 100 to the target compression ratio is performed. As stated above, in the one-shunt current detection method, the current acquisition disabled duration is allowed to appear at a period in accordance with the duty ratio of the PWM pulse. In view of this, in accordance with the duty ratio of the PWM pulse of U-phase coil 198U, V-phase coil 198V, and W-phase coil 198W calculated in the vector control performed this time, a two-phase current acquisition timing is set so as to avoid the current acquisition disabled duration in the next control period. In addition, when the two-phase current acquisition timing is reached, the two-phase current is acquired from shunt resistor 232G. The two-phase current thus acquired is referred to in the next control period, and is utilized in the vector control of three-phase brushless motor 198.

Figure 7:
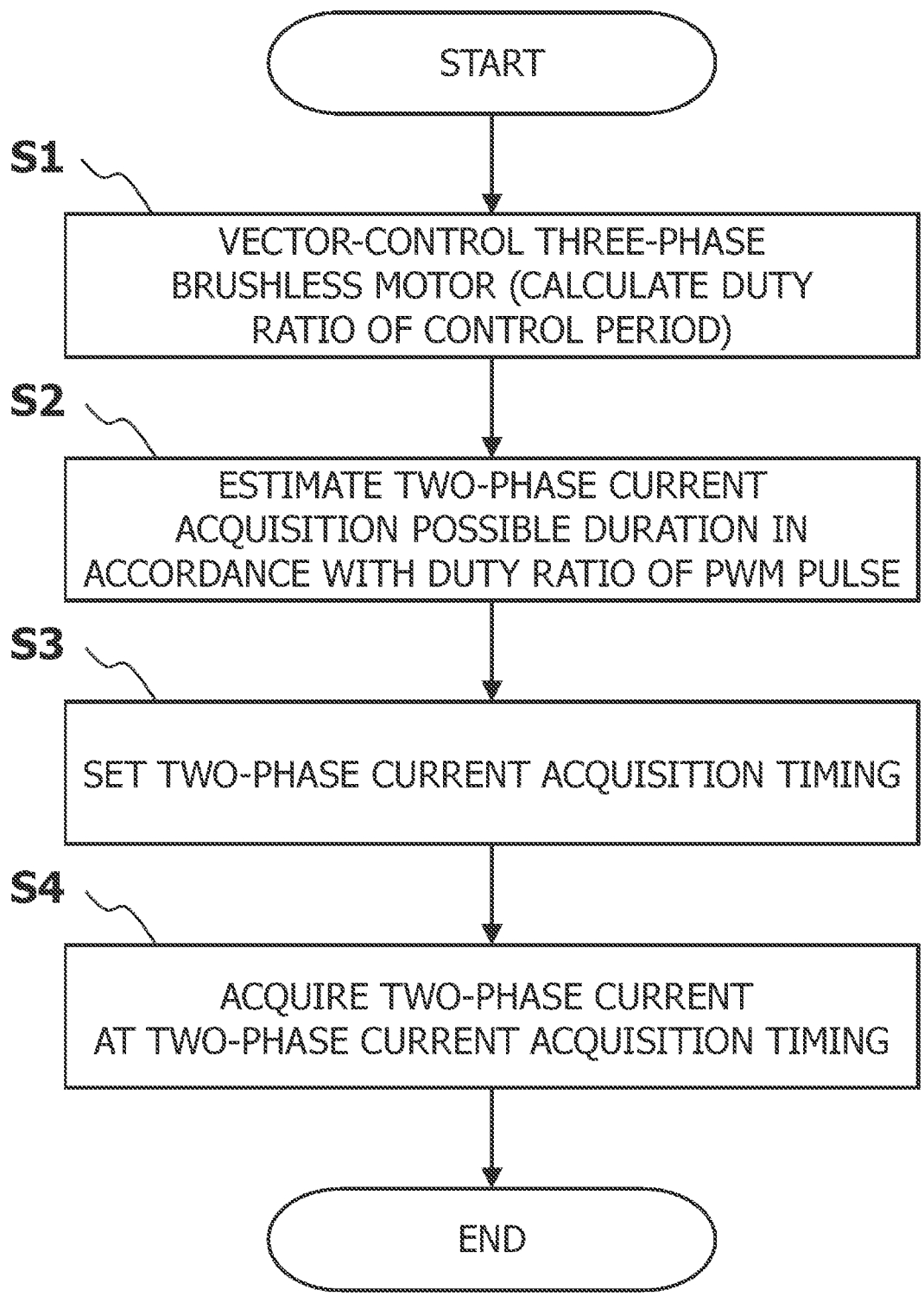
FIG. 7 is a flowchart for the two-phase current acquisition method according to the first embodiment.

FIG. 7 illustrates an example of a vector control processing flowchart for three-phase brushless motor 198 into which the current acquisition method according to the first embodiment is incorporated. Upon starting VCR controller 230, vector control processing is executed at the initial stage of the control period by a processor A of microcomputer 234. The vector control processing is functionally implemented through the execution, by processor A of microcomputer 234, of an application program stored in non-volatile memory B.

In step 1 (abbreviated to S1 in FIG. 7; this applies to the following description), the processor A of microcomputer 234 executes the vector control described in relation to FIG. 4, and vector-controls three-phase brushless motor 198 so as to attain a target compression ratio provided by external engine controller 250. At this time, the processor A of microcomputer 234 respectively calculates the duty ratios of the PWM pulses of U-phase coil 198U, V-phase coil 198V, and W-phase coil 198W of three-phase brushless motor 198. Regarding the details of the vector control, what has been described with reference to FIG. 4 is to be referred to if necessary (This applies to the following).

In step 2, in accordance with the duty ratios of the PWM pulses of U-phase coil 198U, V-phase coil 198V, and W-phase coil 198W of three-phase brushless motor 198, the processor A of microcomputer 234 estimates a two-phase current acquisition possible duration allowing accurate acquisition of the two-phase current in the next control period. That is, the processor A of microcomputer 234 estimates a two-phase current acquisition possible duration avoiding the current acquisition disabled duration in accordance with the duty ratios of the PWM pulses.

In step 3, the processor A of microcomputer 234 sets, within the two-phase current acquisition possible duration, the two-phase current acquisition timing immediately before the start of the vector control in the next control period. That is, in the two-phase current acquisition possible duration, the processor A of microcomputer 234 sets a two-phase current acquisition timing as close as possible to the vector control starting point in time. The two-phase current acquisition timing can only be set once with respect to one PWM pulse (This applies to the following).

In step 4, when the two-phase current acquisition timing is reached, the processor A of microcomputer 234 reads the two-phase current signal of shunt resistor 232G, thereby acquiring the two-phase current.

Figure 8:
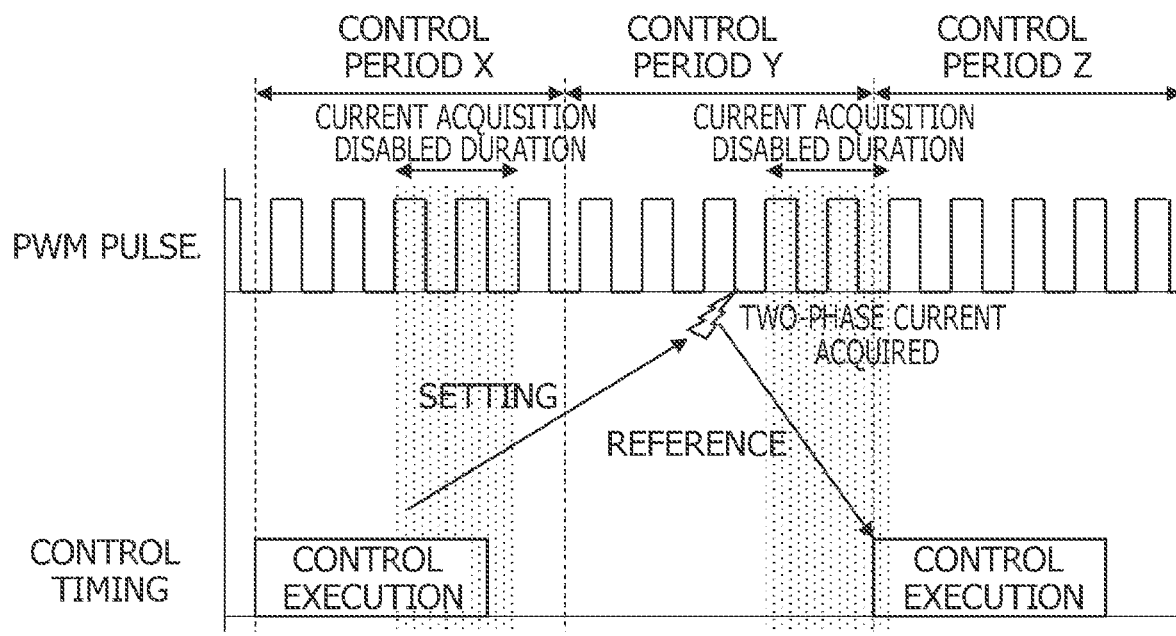
FIG. 8 is an explanatory view illustrating the operation of the two-phase current acquisition method according to the first embodiment.

As illustrated in FIG. 8, according to this vector control processing, when vector control is executed at the initial stage of the control period X, the two-phase current acquisition timing thereof is set prior to the next control period Y. In addition, when the two-phase current acquisition timing of the control period Y is reached, the two-phase current is acquired from shunt resistor 232G, and this is temporarily stored in the volatile memory C. After this, at the initial stage of the control period Z, the two-phase current temporarily stored in the volatile memory C is referred to, and three-phase brushless motor 198 is vector-controlled.

In this process, the two-phase current has not been acquired yet at the initial stage of the control period Y, so that the two-phase current may, for example, be set to 0 (a state in which three-phase brushless motor 198 is not being controlled). When this is done, there is a risk of the q-axis current fluctuating more or less in the two control periods immediately after the start of the vector control processing. However, since its absolute value is close to 0, this fluctuation is to be negligible (This applies to the following).

Thus, at the control period from the control period Z onward, the two-phase current has been acquired in the preceding control period, so that the difference between the two-phase current acquired from shunt resistor 232G and the actual two-phase current is diminished or nullified, and it is possible to suppress great fluctuation of the actual current, in particular, the q-axis current.

2. Second Embodiment

Figure 9:
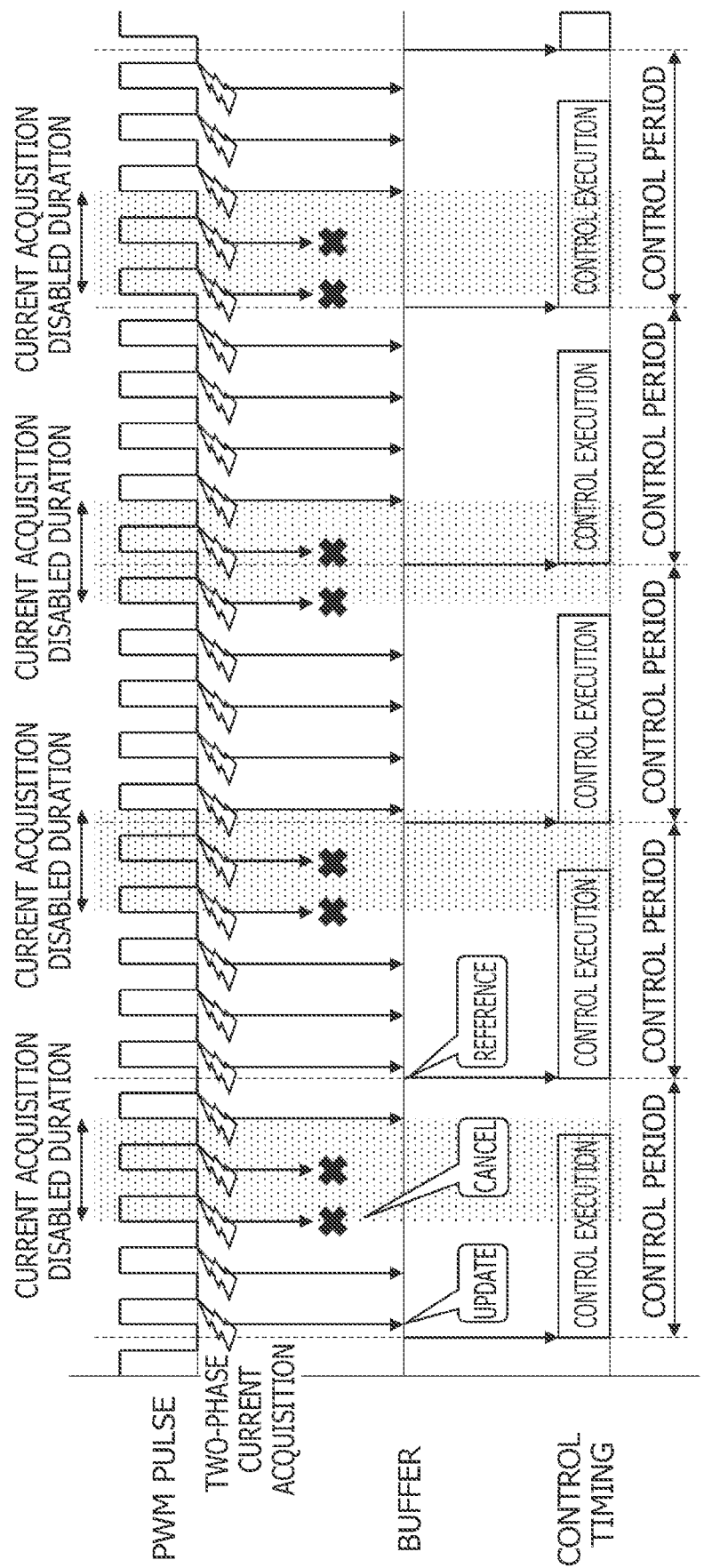
FIG. 9 is a schematic view of a two-phase current acquisition method according to a second embodiment.

FIG. 9 schematically illustrates a current acquisition method according to a second embodiment. As in the first embodiment described above, in the second embodiment, the control period during which three-phase brushless motor 198 is vector-controlled is double the current acquisition disabled duration or more, and, under this condition, is set to a fixed value in accordance, for example, with requisite control precision. As in the first embodiment described above, the period of the PWM pulses is set to not more than the period during which the current acquisition disabled duration appears.

At the initial stage of the control period, three-phase brushless motor 198 is vector-controlled, and feedback control for approximating the compression ratio of internal combustion engine 100 to the target compression ratio is performed. As stated above, in the one-shunt current detection method, a current acquisition disabled duration is allowed to appear at a period in accordance with the duty ratio of the PWM pulse. In view of this, the two-phase current is acquired from shunt resistor 232G at the entire two-phase current acquisition timing in synchronism with the PWM pulse. As can be easily understood from FIG. 9, the two-phase current thus acquired has the possibility of having been acquired during the current acquisition disabled duration. Thus, it is determined whether or not the two-phase current has been accurately acquired from the duty ratio of the PWM pulse. When the two-phase current has been normally acquired, the buffer maintaining the two-phase current is updated, and when the two-phase current cannot be normally acquired, that two-phase current is cancelled. The two-phase current thus acquired is referred to in the next control period, and is utilized for the vector control of three-phase brushless motor 198.

Figure 10:
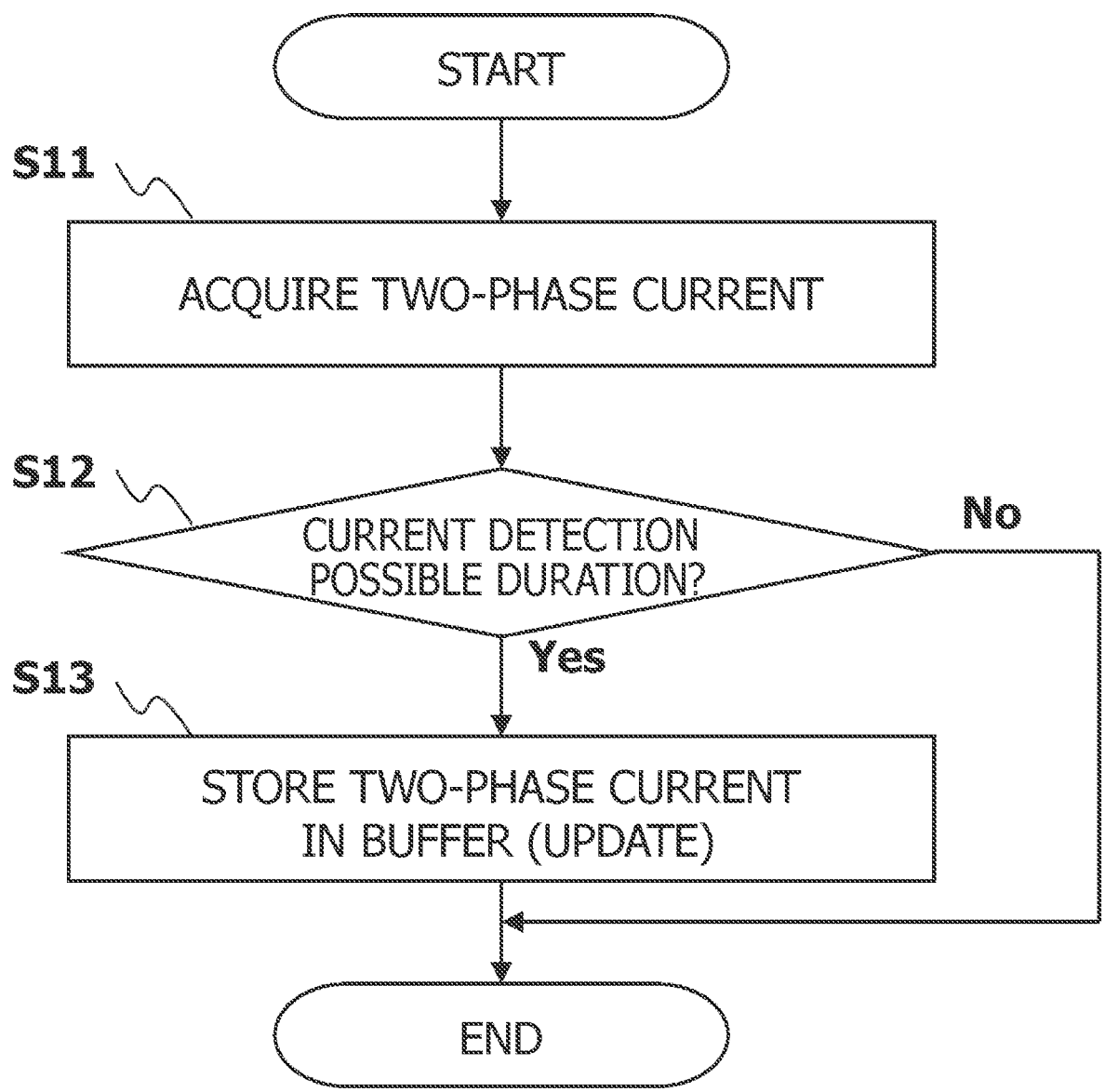
FIG. 10 is a flowchart for the two-phase current acquisition method according to the second embodiment.

FIG. 10 illustrates an example of a current acquisition processing flowchart according to the second embodiment which is executed in synchronism with the PWM pulse as a task different from the vector control of three-phase brushless motor 198. The current acquisition processing is functionally implemented through the execution of the application program stored in the non-volatile memory B by the processor A of microcomputer 234.

In step 11, the processor A of microcomputer 234 reads a two-phase current signal from shunt resistor 232G, whereby the two-phase current is acquired.

In step 12, the processor A of microcomputer 234 determines, in accordance with the duty ratio of the PWM pulse at the timing which the two-phase current has been acquired, whether or not that timing was in the current detection possible duration, which is not the current acquisition disabled duration. In addition, when the processor A of microcomputer 234 determines that the timing at which the two-phase current was acquired was in the current detection possible duration (Yes), the procedure advances to step 13. On the other hand, when the processor A of microcomputer 234 determines that the timing at which the two-phase current was acquired was not in the current detection possible duration, that is, that it was in the current acquisition disabled duration (No), the processing of the task is completed.

In step 13, the processor A of microcomputer 234 stores the two-phase current in the buffer to update the same.

Figure 11:
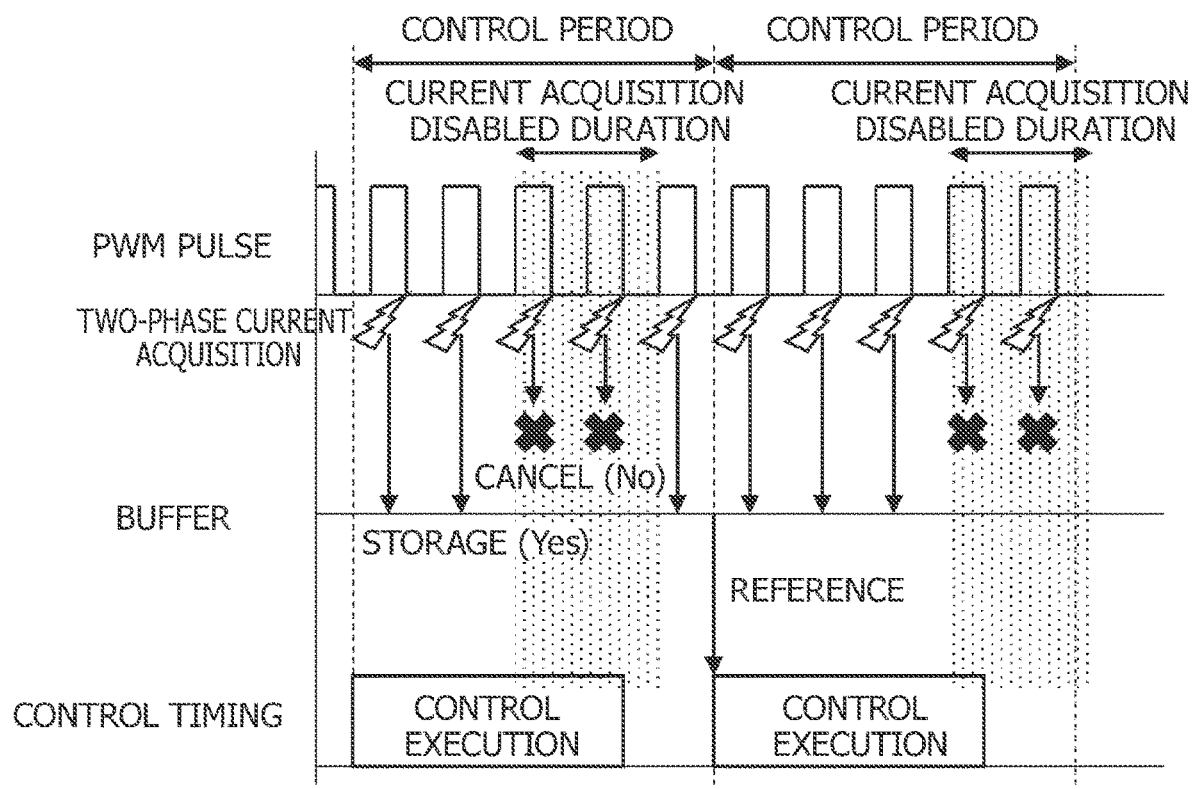
FIG. 11 is an explanatory view illustrating the operation of the two-phase current acquisition method according to the second embodiment.

As illustrated in FIG. 11, according to this current acquisition processing, the two-phase current is acquired in synchrony with the PWM pulse independently of the control period. It is determined whether or not the two-phase current has been acquired accurately in accordance with the duty ratio of the PWM pulse, and solely in the case in which the two-phase current has been accurately acquired, this is stored in the buffer and updated. On the other hand, in the case in which the two-phase current has not been accurately acquired, this is cancelled and is not used. In addition, when three-phase brushless motor 198 is vector-controlled at the initial stage of the next control period, the two-phase current stored in the buffer is referred to, and three-phase brushless motor 198 is vector-controlled.

Accordingly, as can be easily understood from FIG. 11, when three-phase brushless motor 198 is vector-controlled, a two-phase current accurately acquired is referred to, so that the difference between the two-phase current acquired from shunt resistor 232G and the actual two-phase current is diminished or nullified, making it possible to suppress great fluctuation of the actual current, in particular, the q-axis current.

3. Third Embodiment

Figure 12:
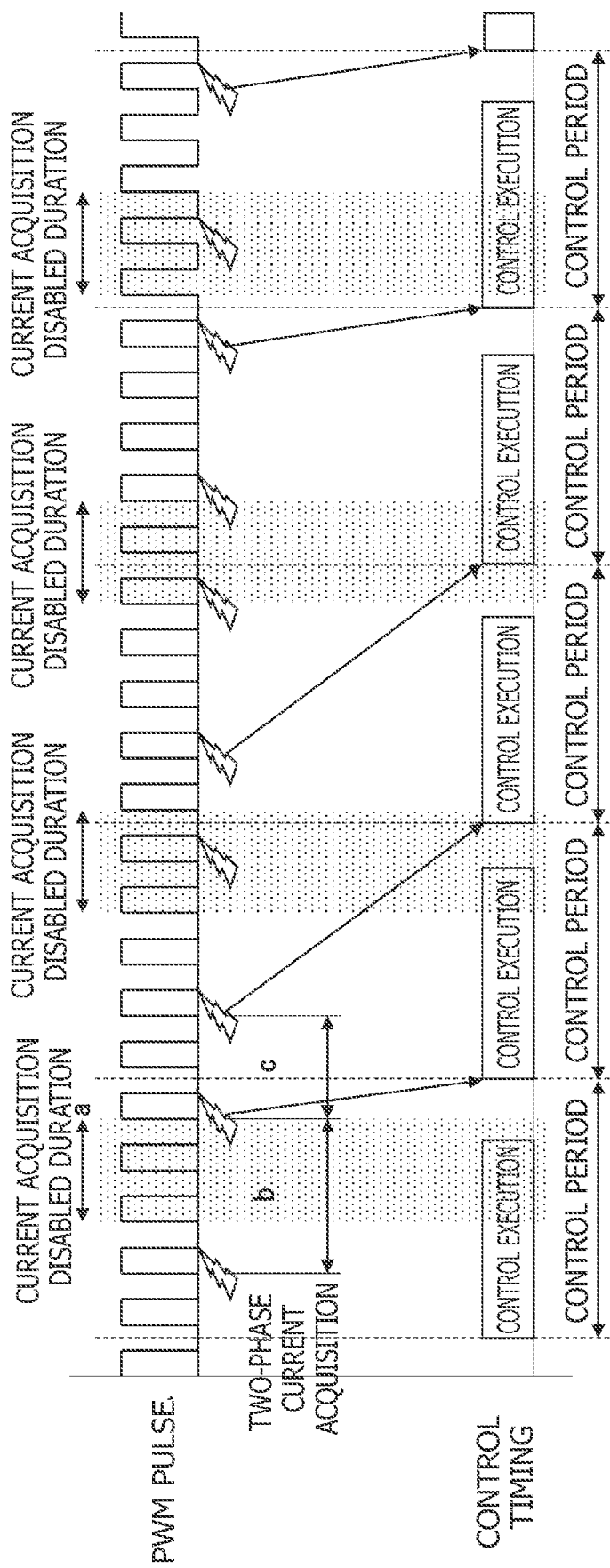
FIG. 12 is a schematic view of a two-phase current acquisition method according to a third embodiment.

FIG. 12 schematically illustrates a current acquisition method according to a third embodiment. As in the first embodiment and the second embodiment described above, in the third embodiment, the control period during which three-phase brushless motor 198 is vector-controlled is not less than double the current acquisition disabled duration, and, under this condition, is set to a fixed value in accordance, for example, with the requisite control precision. As in the first embodiment and the second embodiment described above, the period of the PWM pulse is set to a level not more than the period during which the current acquisition disabled duration appears.

At the initial stage of the control period, three-phase brushless motor 198 is vector-controlled, and feedback control for approximating the compression ratio of internal combustion engine 100 to the target compression ratio is performed. As described above, in the one-shunt current detection method, a current acquisition disabled duration is allowed to appear at a period in accordance with the duty ratio of the PWM pulse. In view of this, in accordance with the duty ratio of the PWM pulse of U-phase coil 198U, V-phase coil 198V, and W-phase coil 198W calculated in the vector control performed this time, from among a plurality of previously set two-phase current acquisition timings, a two-phase current acquisition timing is set that allows accurate acquisition of the two-phase current in the next control period and is closest to the initial stage of the succeeding control period. Here, the plurality of two-phase current acquisition timings are set so as to be not less than the current acquisition disabled duration which is regarded to be maximum in the interval between two consecutive two-phase current acquisition timings. In addition, as in the first embodiment and the second embodiment described above, the two-phase current is acquired from shunt resistor 232G when the two-phase current acquisition timing is reached. The two-phase current thus acquired is referred to in the next control period, and is utilized in the vector control of three-phase brushless motor 198.

Figure 13:
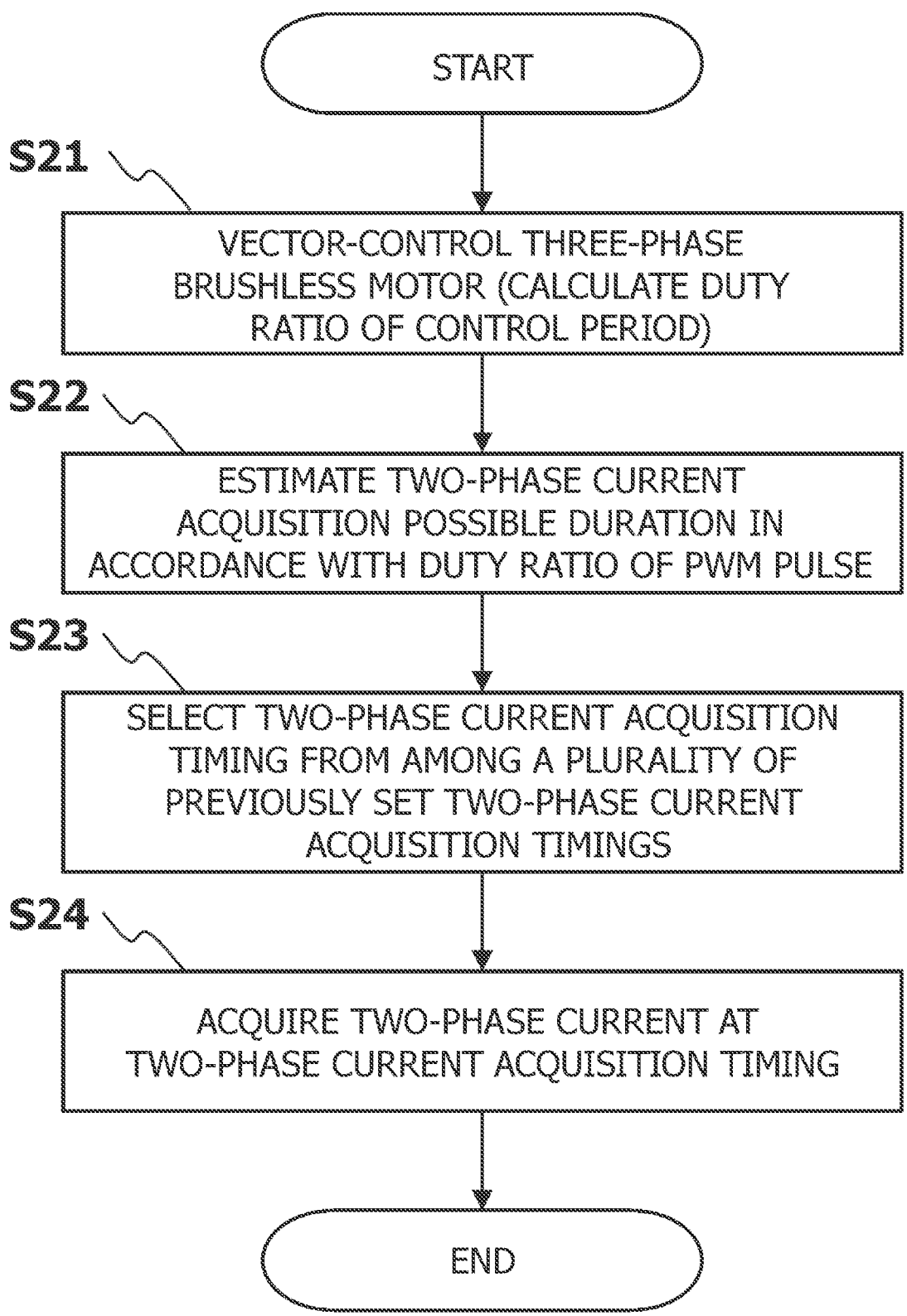
FIG. 13 is a flowchart for the two-phase current acquisition method according to the third embodiment.

FIG. 13 illustrates an example of a vector control processing flowchart for three-phase brushless motor 198 into which the current acquisition method according to the third embodiment is incorporated. Upon the starting of VCR controller 230, the vector control processing is executed by the processor A of microcomputer 234 thereof at the initial stage of the control period. The vector control processing is functionally implemented by the processor A of microcomputer 234 through the execution of the application program stored in the non-volatile memory B.

In step 21, the processor A of microcomputer 234 executes the vector control described with reference to FIG. 4, and vector-controls three-phase brushless motor 198 so as to attain the target compression ratio given by external engine controller 250. At this time, the processor A of microcomputer 234 respectively calculates the duty ratios of the PWM pulses of U-phase coil 198U, V-phase coil 198V, and W-phase coil 198W of three-phase brushless motor 198.

In step 22, the processor A of microcomputer 234 estimates, in accordance with the duty ratios of the PWM pulses of U-phase coil 198U, V-phase coil 198V, and W-phase coil 198W of three-phase brushless motor 198, the two-phase current acquisition possible duration allowing accurate acquisition of the two-phase current in the next control period.

In step 23, the processor A of microcomputer 234 sets, from among a plurality of previously set two-phase current acquisition timings, the two-phase current acquisition possible duration and the two-phase current acquisition timing immediately before the start of the vector control in the next control period.

In step 24, when the two-phase current acquisition timing is reached, the processor A of microcomputer 234 reads the two-phase current signal of shunt resistor 232G, thereby acquiring the two-phase current.

Figure 14:
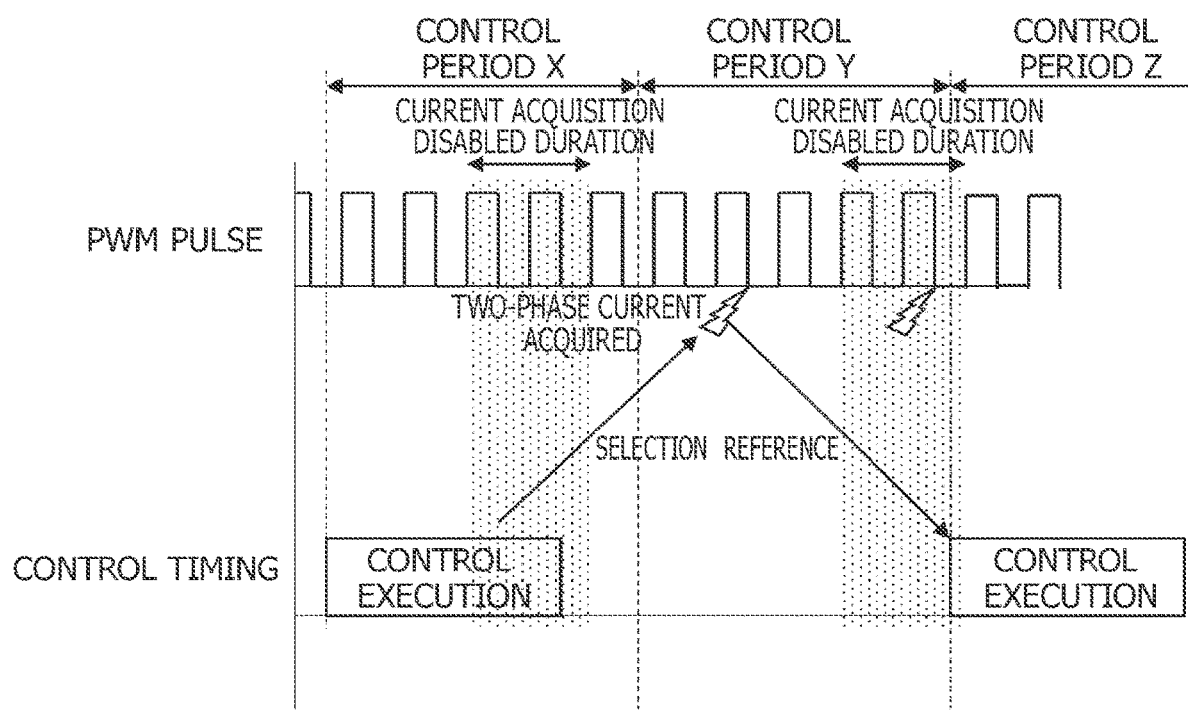
FIG. 14 is an explanatory view illustrating the operation of the two-phase current acquisition method according to the third embodiment.

As illustrated in FIG. 14, according to this vector control processing, when vector control is to be executed at the initial stage of the control period X, the two-phase current acquisition timing at the next control period Y is set from among a plurality of previously set two-phase current acquisition timings. In addition, when the two-phase current acquisition timing of the control period Y is reached, the two-phase current is acquired from shunt resistor 232G, and this is temporarily stored in volatile memory C. After this, at the initial stage of the control period Z, the two-phase current temporarily stored in the volatile memory C is referred to, and three-phase brushless motor 198 is vector-controlled. The current acquisition method of the third embodiment differs from that of the first embodiment solely in that the two-phase current acquisition timing is set from among a plurality of previously set two-phase current acquisition timings. Thus, the operation and effect thereof are the same as those of the first embodiment described above, so that a redundant description thereof will be left out.

4. Fourth Embodiment

Figure 15:
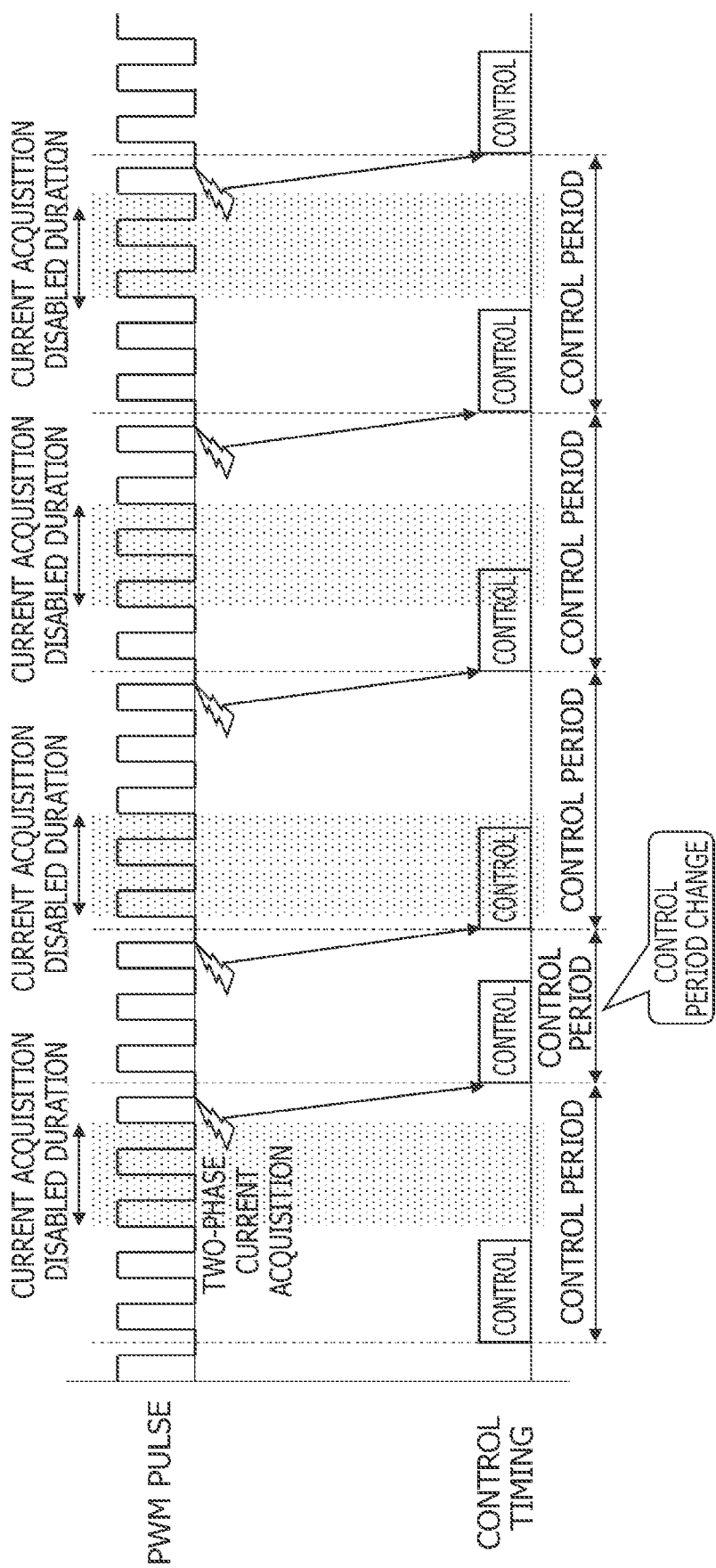
FIG. 15 is a schematic view of a two-phase current acquisition method according to a fourth embodiment.

FIG. 15 schematically illustrates a current acquisition method according to a fourth embodiment. Unlike the first through third embodiments described above, in the fourth embodiment, the control period during which three-phase brushless motor 198 is vector-controlled is double the current acquisition disabled duration or more, and, under this condition, there is made initial setting to, for example, a reference period which is the maximum period capable of satisfying the requisite control precision, and this is made variable as needed. As in the first through third embodiments described above, the period of the PWM pulses is set to a level not more than the period at which the current acquisition disabled duration appears.

At the initial stage of the control period, three-phase brushless motor 198 is vector-controlled, and feedback control for approximating the compression ratio of internal combustion engine 100 to the target compression ratio is performed. As described above, in the one-shunt current detection method, a current acquisition disabled duration is allowed to appear at a period in accordance with the duty ratio of the PWM pulse. In view of this, the next control period is varied as needed in accordance with the duty ratios of the PWM pulses of U-phase coil 198U, V-phase coil 198V, and W-phase coil 198W calculated in the vector control performed this time, thereby preventing the two-phase current acquisition timing from becoming a current acquisition disabled duration. The two-phase current thus acquired is referred to in the next control period, and is utilized in the vector control of three-phase brushless motor 198.

Figure 16:
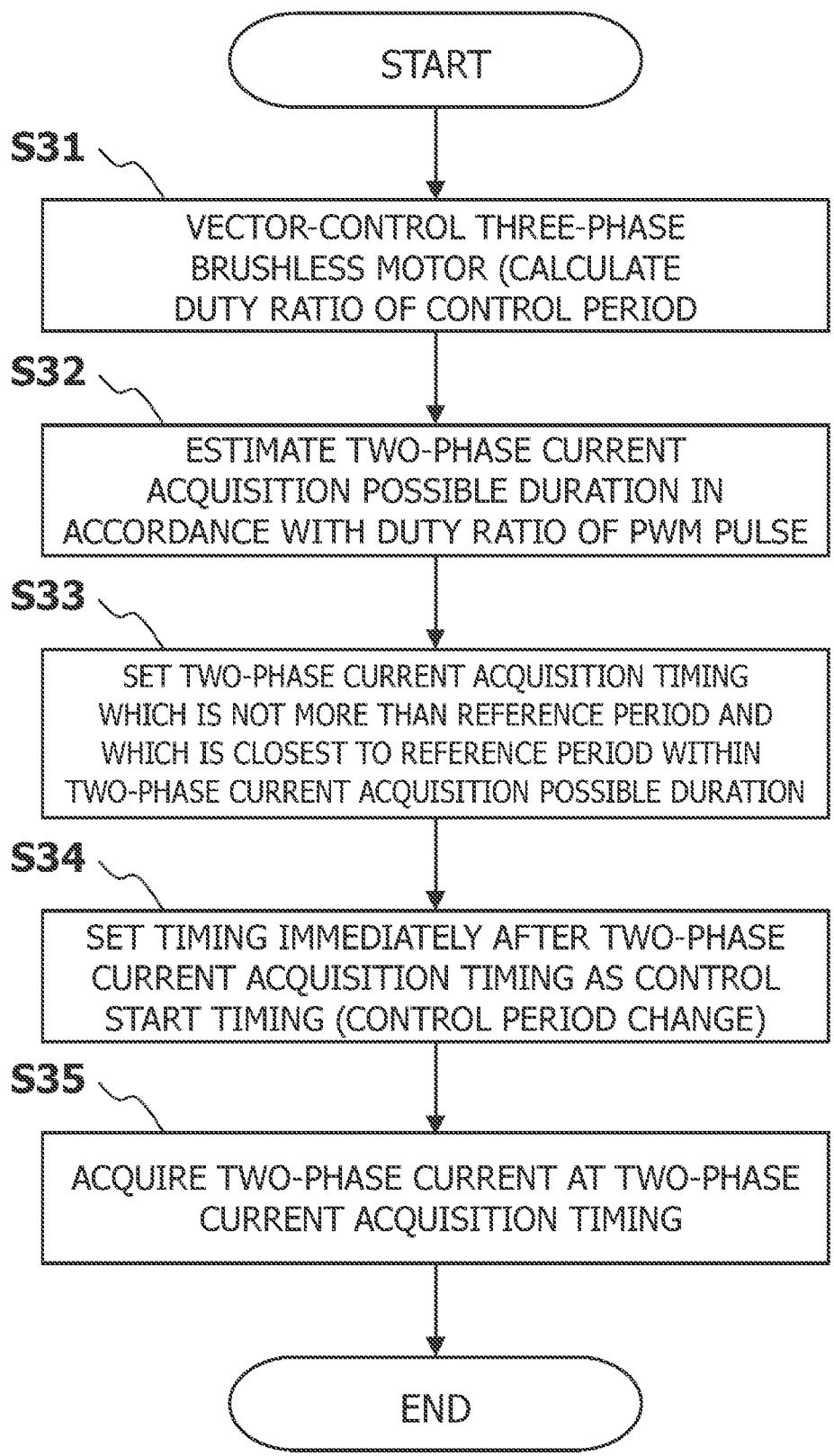
FIG. 16 is a flowchart for the two-phase current acquisition method according to the fourth embodiment.

FIG. 16 illustrates an example of the vector control processing flowchart for three-phase brushless motor 198 into which the current acquisition method of the fourth embodiment is incorporated. Upon the starting of VCR controller 230, the vector control processing is executed by the processor A of microcomputer 234 thereof at the initial stage of the control period. The vector control processing is functionally implemented through the execution by the processor A of microcomputer 234 of the application program stored in the non-volatile memory B.

In step 31, the processor A of microcomputer 234 executes the vector control described with reference to FIG. 4, and three-phase brushless motor 198 is vector-controlled so as to attain the target compression ratio given by external engine controller 250. At this time, the processor A of microcomputer 234 respectively calculates the duty ratios of the PWM pulses of U-phase coil 198U, V-phase coil 198V, and W-phase coil 198W of three-phase brushless motor 198.

In step 32, the processor A of microcomputer 234 estimates the two-phase current acquisition possible duration allowing accurate acquisition of the two-phase current in the next control period in accordance with the duty ratios of the PWM pulses of U-phase coil 198U, V-phase coil 198V, and W-phase coil 198W of three-phase brushless motor 198.

In step 33, within the two-phase current acquisition possible duration, the processor A of microcomputer 234 sets a two-phase current acquisition timing which is not more than the reference period and closest to the reference period.

In step 34, the processor A of microcomputer 234 sets the timing immediately after the two-phase current acquisition timing as the start timing for the vector control in the next control period. In short, the processor A of microcomputer 234 makes the start timing of the next control period earlier, thereby varying the control period.

In step 35, when the two-phase current acquisition timing is reached, the processor A of microcomputer 234 reads the two-phase current signal of shunt resistor 232G, whereby the two-phase current is acquired.

Figure 17:
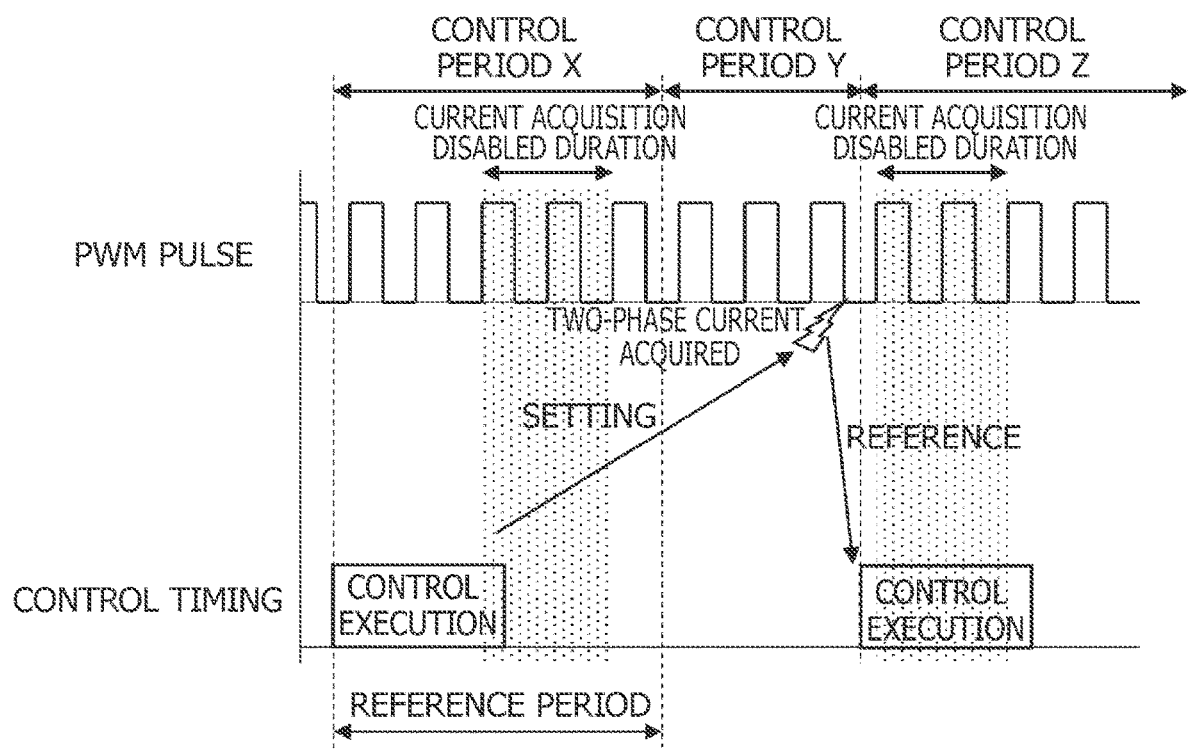
FIG. 17 is an explanatory view illustrating the operation of the two-phase current acquisition method according to the fourth embodiment.

As illustrated in FIG. 17, according to this vector control processing, when vector control is executed at the initial stage of the control period X, the two-phase current acquisition timing in the next control period Y is set and the control period Y is varied. In addition, when the two-phase current acquisition timing of the control period Y is reached, the two-phase current of shunt resistor 232G is acquired, and this is temporarily stored in the volatile memory C. After this, at the initial stage of the control period Z, the two-phase current temporarily stored in the volatile memory C is referred to, and three-phase brushless motor 198 is vector-controlled.

Thus, as can be easily understood from FIG. 17, the two-phase current acquisition timing is set so as to avoid the next current acquisition disabled duration, and vector control is started immediately after this, so that the difference between the two-phase current acquired from shunt resistor 232G and the actual two-phase current is diminished or nullified, making it possible to suppress great fluctuation of the actual current, in particular, the q-axis current.

5. Confirmation of the Effects

Figure 18:
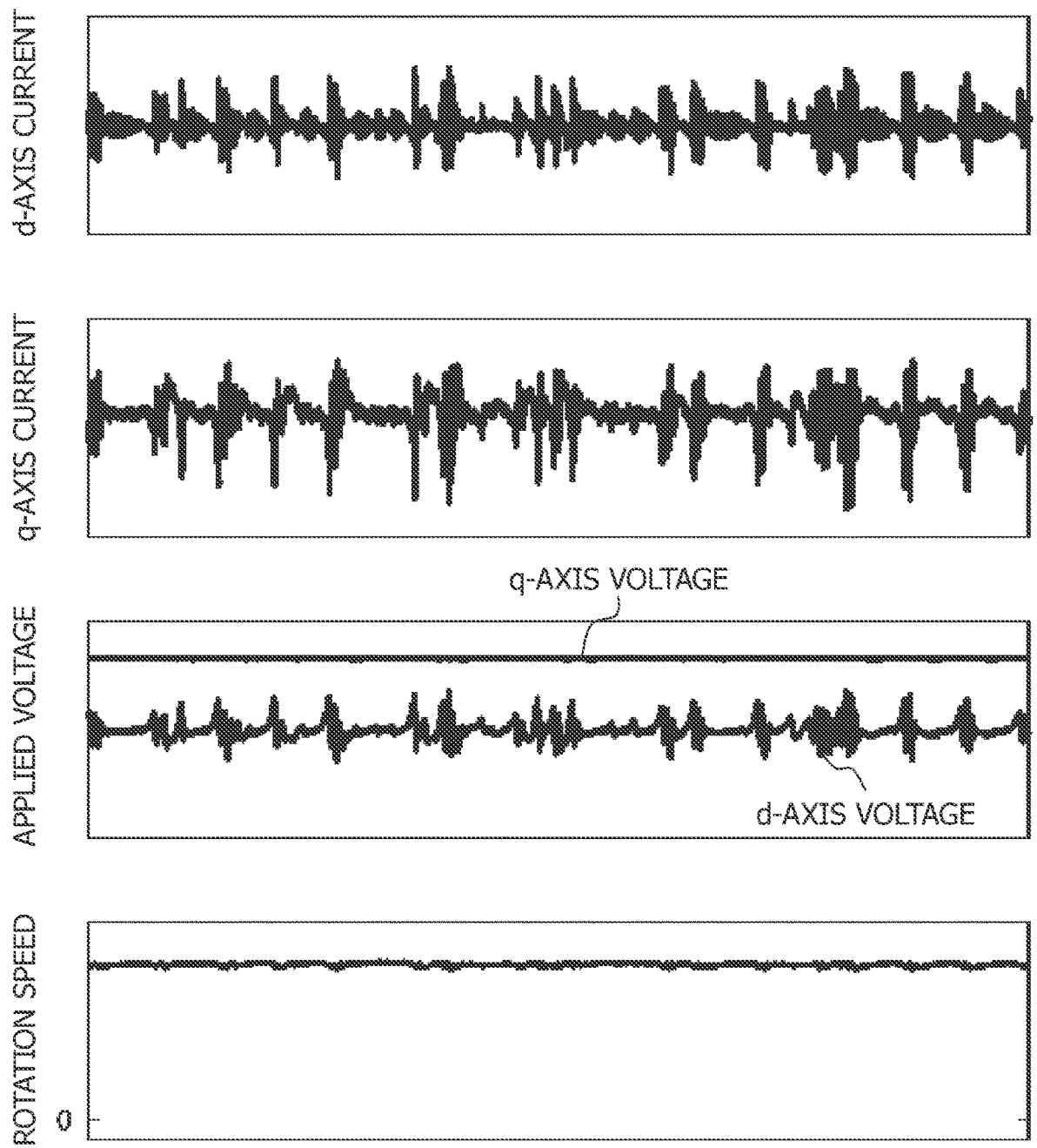
FIG. 18 is an explanatory view of a control result in a prior-art technique.
Figure 19:
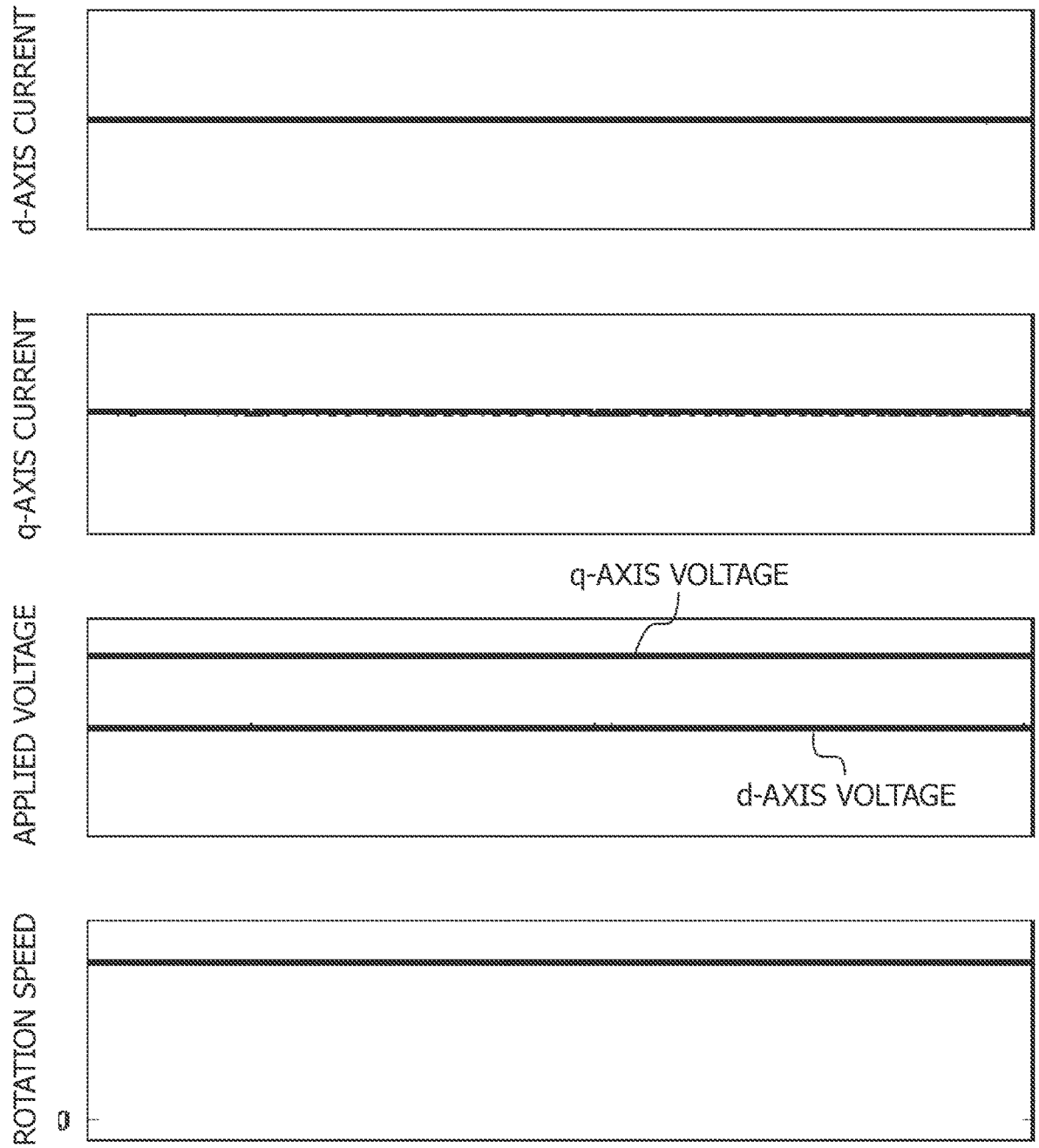
FIG. 19 is an explanatory view of a control result in the present embodiment.

When three-phase brushless motor 198 is vector-controlled by using the one-shunt current detection method of the prior-art technique, an attempt is made to acquire the two-phase current during a current acquisition disabled duration, so that, as illustrated in FIG. 18, the d-axis current and the q-axis current fluctuate greatly. However, when three-phase brushless motor 198 is vector-controlled in accordance with the first through fourth embodiments, the two-phase current is acquired in the previous control period, so that, as illustrated in FIG. 19, the fluctuation of the d-axis current and the q-axis current is substantially diminished.

In the above-described embodiments, if, for example, the two-phase current cannot be accurately acquired due to an unexpected cause such as noise, the two-phase current may be estimated from the accurately acquired one-phase current and the two-phase current accurately acquired in the previous control period. By doing so, even if the two-phase current cannot be accurately acquired, the two-phase current is estimated from the accurately acquired one-phase current and the two-phase current acquired in the previous control period, so that it is possible to make the difference from the actual current as small as possible in the vector control of three-phase brushless motor 198.

The above-described embodiments may be executed in the case in which the PWM pulse applied to three-phase brushless motor 198 is of excessive modulation. By doing so, when the PWM pulse is not of excessive modulation, it is possible to avoid generation of a state in which the two-phase current cannot be accurately acquired by means of pulse shift, and it is possible, for example, to suppress an increase in the control load.

Furthermore, in the above-described embodiments, in the case in which there is a time difference between the acquisition timing of the two-phase current and the acquisition timing of the parameter obtained from the two-phase current, the parameter may be corrected in accordance with the time difference. That is, in the case in which there is a time difference between the two-phase current acquisition timing and the acquisition timing of the d-axis currents $I_d$ and $I_q$ obtained from the two-phase current, the d-axis currents $I_d$ and the q-axis current $I_q$ are respectively corrected in accordance with the time difference, so that it is possible to eliminate the time delay and to achieve an improvement in terms of control precision.

Those skilled in the art will easily understand that it is possible to give birth to a new embodiment by partially omitting, partially combining as appropriate, or partially replacing the technical ideas of the various embodiments described above.

For example, the three-phase brushless motor constituting the object of control is not restricted to the actuator of VCR mechanism 190 but may also be an arbitrary vehicle-mounted three-phase brushless motor, such as the actuator of VTC mechanism 180, the actuator of an electric steering system, or the actuator of an electric cooling system.

REFERENCE SYMBOL LIST

198 Three-phase brushless motor
230 VCR controller (control device)
232 Inverter (drive circuit)
232G Shunt resistor

The invention claimed is:

1. A three-phase brushless motor control device which uses one shunt resistor disposed on a bus of a drive circuit driving a three-phase brushless motor and acquires a two-phase current of the three-phase brushless motor at a predetermined timing to vector-control the three-phase brushless motor,
wherein an acquisition timing of the two-phase current is varied in accordance with a duration in which the two-phase current cannot be accurately acquired.

2. The three-phase brushless motor control device according to claim 1, wherein
a control period of the three-phase brushless motor is set to be not less than double the duration in which the two-phase current cannot be accurately acquired; and
a period of a pulse width modulation pulse applied to the three-phase brushless motor is set to be not more than a period during which a state in which the two-phase current cannot be accurately acquired arises.

3. The three-phase brushless motor control device according to claim 1, wherein, prior to a next control period, a timing at which the two-phase current can be accurately acquired is estimated.

4. The three-phase brushless motor control device according to claim 3, wherein the timing at which the two-phase current can be accurately acquired is estimated in accordance with a duty ratio of the pulse width modulation pulse.

5. The three-phase brushless motor control device according to claim 3, wherein, in accordance with a duty ratio of the pulse width modulation pulse, the timing at which the two-phase current can be accurately acquired is selected from among a plurality of previously set two-phase current acquisition timings.

6. The three-phase brushless motor control device according to claim 1, wherein, in a case in which the two-phase current cannot be accurately acquired, the two-phase current is estimated from an accurately acquired one-phase current and a two-phase current accurately acquired in a previous control period.

7. The three-phase brushless motor control device according to claim 1, wherein, in a case in which a pulse width modulation wave applied to the three-phase brushless motor is of excessive modulation, an acquisition timing of the two-phase current is varied in accordance with the duration in which the two-phase current cannot be accurately acquired.

8. The three-phase brushless motor control device according to claim 1, wherein, in a case in which there is a time difference between an acquisition timing of the two-phase current and an acquisition timing of a parameter obtained from the two-phase current, the parameter is corrected in accordance with the time difference.

9. A three-phase brushless motor control device which uses one shunt resistor disposed on a bus of a drive circuit driving a three-phase brushless motor, and acquires a two-phase current of the three-phase brushless motor at a predetermined timing to vector-control the three-phase brushless motor,
wherein a period during which the three-phase brushless motor is vector-controlled is varied in accordance with a duration in which the two-phase current cannot be accurately acquired.

10. The three-phase brushless motor control device according to claim 9, wherein, in a case in which the two-phase current cannot be accurately acquired, the two-phase current is estimated from a one-phase current accurately acquired and a two-phase current acquired in a previous control period.

11. The three-phase brushless motor control device according to claim 9, wherein, in a case in which a pulse width modulation wave applied to the three-phase brushless motor is of excessive modulation, the period during which the three-phase brushless motor is vector-controlled is varied in accordance with a duration in which the two-phase current cannot be accurately acquired.

12. The three-phase brushless motor control device according to claim 9, wherein, in a case in which there is a time difference between an acquisition timing of the two-phase current and an acquisition timing of a parameter obtained from the two-phase current, the parameter is corrected in accordance with the time difference.

13. A three-phase brushless motor control method, wherein, in accordance with a duration in which a control device using one shunt resistor disposed on a bus of a drive circuit driving a three-phase brushless motor and acquiring a two-phase current of the three-phase brushless motor at a predetermined timing to vector-control the three-phase brushless motor cannot accurately acquire the two-phase current, an acquisition timing of the two-phase current is varied.

14. The three-phase brushless motor control method according to claim 13, wherein
a control period of the three-phase brushless motor is set to not less than double the duration in which the two-phase current cannot be accurately acquired; and
the control device sets a period of a pulse width modulation pulse applied to the three-phase brushless motor to a period not more than the period during which a state in which the two-phase current cannot be accurately acquired arises.

15. The three-phase brushless motor control method according to claim 13, wherein, prior to a next control period, the control device estimates a timing at which the two-phase current can be accurately acquired.

16. The three-phase brushless motor control method according to claim 13, wherein, in a case in which the two-phase current cannot be accurately acquired, the control device estimates the two-phase current from a one-phase current accurately acquired and a two-phase current accurately acquired in a previous control period.

17. The three-phase brushless motor control method according to claim 13, wherein, in a case in which a pulse width modulation wave applied to the three-phase brushless motor is of excessive modulation, the control device varies the acquisition timing of the two-phase current in accordance with the duration in which the two-phase current cannot be accurately acquired.

18. A three-phase brushless motor control method, wherein, in accordance with a duration in which a control device using one shunt resistor disposed on a bus of a drive circuit driving a three-phase brushless motor and acquiring a two-phase current of the three-phase brushless motor at a predetermined timing to vector-control the three-phase brushless motor cannot accurately acquire the two-phase current, the period during which the three-phase brushless motor is vector-controlled is varied.

19. The three-phase brushless motor control method according to claim 18, wherein, in a case in which the two-phase current cannot be accurately acquired, the control device estimates the two-phase current from a one-phase current accurately acquired and a two-phase current acquired in a previous control period.

20. The three-phase brushless motor control method according to claim 18, wherein, in a case in which a pulse width modulation wave applied to the three-phase brushless motor is of excessive modulation, the control device varies the period during which the three-phase brushless motor is vector-controlled in accordance with the duration in which the two-phase current cannot be accurately acquired.

* * * * *